US012647822B2

(12) United States Patent
Yao et al.

(10) Patent No.: US 12,647,822 B2
(45) Date of Patent: Jun. 2, 2026

(54) COMMUNICATION METHOD AND APPARATUS TO REDUCE TRANSMISSION RESOURCES

(71) Applicant: Huawei Technologies Co., Ltd., Shenzhen (CN)

(72) Inventors: Chuting Yao, Beijing (CN); Ao Guo, Shanghai (CN); Jian Wang, Beijing (CN); Jianhua Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 486 days.

(21) Appl. No.: 17/801,184

(22) PCT Filed: Oct. 20, 2020

(86) PCT No.: PCT/CN2020/122185
§ 371 (c)(1),
(2) Date: Aug. 19, 2022

(87) PCT Pub. No.: WO2021/164287
PCT Pub. Date: Aug. 26, 2021

(65) Prior Publication Data
US 2023/0097297 A1     Mar. 30, 2023

(30) Foreign Application Priority Data

Feb. 21, 2020     (CN) .......................... 202010107913.9

(51) Int. Cl.
*H04W 28/06*     (2009.01)
*H04W 76/27*     (2018.01)
(52) U.S. Cl.
CPC ........... *H04W 28/06* (2013.01); *H04W 76/27* (2018.02)

(58) Field of Classification Search
CPC ... H04W 28/06; H04W 28/065; H04W 28/26; H04W 76/22; H04W 76/27; H04W 52/0209; H04L 69/04; H04L 69/24
See application file for complete search history.

(56) References Cited

U.S. PATENT DOCUMENTS

2019/0149421 A1     5/2019 Jin et al.
2020/0099481 A1     3/2020 Pan et al.
(Continued)

FOREIGN PATENT DOCUMENTS

CN     109246705 A     1/2019
CN     109842905 A     6/2019
(Continued)

OTHER PUBLICATIONS

R5-187735, CATT, Addition of new LTE_UDC-UEConTest test case 7.3.10.1, 3GPP TSG-RAN5 Meeting #81, Spokane, United States, Nov. 12, 2018-Nov. 16, 2018, 6 pages.
(Continued)

*Primary Examiner* — Peter Chen
(74) *Attorney, Agent, or Firm* — WOMBLE BOND DICKINSON (US) LLP

(57)     ABSTRACT

This application relates to a communication method and apparatus. A first device determines to process a first radio bearer in a first processing manner. The first processing manner activates or deactivates a data packet compression function of the first radio bearer. Then, the first device sends first information, where the first information is used to indicate the first processing manner. The first device can send the first information to indicate to activate or deactivate the data packet compression function, which means that the data packet compression function can be deactivated.

17 Claims, 13 Drawing Sheets

(56)　　　　　References Cited

U.S. PATENT DOCUMENTS

2020/0389812 A1*  12/2020  Chen ..................... H04W 76/27
2021/0185560 A1*  6/2021  Shreevastav ...... H04W 28/0236

FOREIGN PATENT DOCUMENTS

| CN | 110741709 | A | 1/2020 |
| WO | 2019166032 | A1 | 9/2019 |
| WO | 2019225888 | A1 | 11/2019 |

OTHER PUBLICATIONS

R5-187736, CATT, Addition of new LTE_UDC-UEConTest test case 7.3.10.2, 3GPP TSG-RAN5 Meeting #81, Spokane, United States, Nov. 12, 2018-Nov. 16, 2018, 4 pages.

* cited by examiner

| D/C | PDCP SN | | Oct1 |
| PDCP SN | | | Oct2 |
| FU | FR | R | R | Checksum | Oct3 |
| UDC data block | | | Oct4 |
| ... | | | |

Network device

Terminal device

Network device

Terminal device

User

| Hyper frame number | Sequence number |
|---|---|

COMMUNICATION METHOD AND APPARATUS TO REDUCE TRANSMISSION RESOURCES

CROSS-REFERENCE TO RELATED APPLICATIONS

This application is a National Stage of International Application No. PCT/CN2020/122185, filed on Oct. 20, 2020, which claims priority to Chinese Patent Application No. 202010107913.9, filed on Feb. 21, 2020. Both of the aforementioned applications are hereby incorporated by reference in their entireties.

TECHNICAL FIELD

This application relates to the field of communication technologies, and in particular, to a communication method and apparatus.

BACKGROUND

In acknowledged mode (AM) transmission in a long term evolution (LTE) system, an uplink data compression (UDC) technology is introduced and implemented at a packet data convergence protocol (PDCP) layer. The UDC technology is mainly used for some data packets with a large amount of repeated content, for example, data packets for transmitting a session initiation protocol (SIP) in a voice over LTE (VoLTE) network service, and is used to transmit different parts between the data packets, so as to reduce a to-be-transmitted data amount.

Whether a UDC function of a data radio bearer (DRB) needs to be activated for a terminal device is configured by a network device. Because the network device does not know whether UDC needs to be performed on uplink data of the terminal device, when configuring the DRB for the terminal device, the network device directly configures the DRB with the activated UDC function. After the UDC function is activated for the DRB, a packet header of a data packet transmitted over the DRB includes a 1-byte UDC header. Whether to compress the data packet by using the UDC technology depends on the terminal device. The terminal device may consider that the data packet does not need to be compressed. For example, the terminal device may not compress the data packet at an initial stage of UDC configuration, or when some packets do not generate a compression gain. However, even if the terminal device does not compress the data packet, because the activated UDC function is configured for the DRB, the UDC header is still carried in the packet header of the data packet sent by the terminal device. This wastes transmission resources.

SUMMARY

Embodiments of this application provide a communication method and apparatus, to reduce transmission resources.

According to some embodiments, a first communication method is provided. The method includes: determining to process a first radio bearer in a first processing manner, where the first processing manner is activating or deactivating a data packet compression function of the first radio bearer; and sending first information, where the first information is used to indicate the first processing manner.

The method may be performed by a first communication apparatus. The first communication apparatus may be a communication device, or may be a communication apparatus, for example, a chip, that can support the communication device to implement a function required in the method. For example, the first communication apparatus is a first device, or a chip that is deployed in the first device and configured to implement a function of the first device, or another component configured to implement a function of the first device. The first device is, for example, a terminal device or a network device. In the following description process, an example in which the first communication apparatus is the first device is used.

In this embodiment of this application, the data packet compression function can be activated or deactivated. If the data packet compression function of the radio bearer is deactivated, a packet header of a data packet transmitted over the radio bearer no longer includes a compression packet header. This can reduce transmission resources. In other words, if the first device considers that the data packet compression function does not need to be used for the first radio bearer, the first device does not need to disable the data packet compression function of the first radio bearer, and only needs to deactivate the data packet compression function of the first radio bearer. Even if the data packet compression function of the radio bearer is deactivated, the data packet compression function is still configured for the radio bearer, that is, configuration of the data packet compression function is not removed with a deactivation operation. Therefore, if the data packet compression function of the radio bearer needs to be re-activated after the data packet compression function of the radio bearer is deactivated, the data packet compression function of the radio bearer only needs to be activated, and the network device does not need to reconfigure the packet compression function for the radio bearer. This reduces a configuration process of the network device, and also reduces signaling overheads. In addition, to activate or deactivate the data packet compression function of the radio bearer, an intra-cell handover procedure does not need to be performed. This simplifies a process of deactivating the data packet compression function, reduces required time, and improves efficiency.

In some embodiments, deactivating a data packet compression function of the first radio bearer indicates changing the data packet compression function of the first radio bearer from an active state to an inactive state; and/or activating a data packet compression function of the first radio bearer indicates changing the data packet compression function of the first radio bearer from an inactive state to an active state, where in the active state, a data packet over the first radio bearer includes a compression packet header, and in the inactive state, a data packet over the first radio bearer does not include a compression packet header.

In this embodiment of this application, the data packet compression function of the radio bearer can be activated or deactivated. Therefore, the data packet compression function can be re-activated when the data packet compression function needs to be used, and the data packet compression function can be deactivated when the data packet compression function does not need to be used. In this way, a packet header of the data packet transmitted over the radio bearer no longer includes information corresponding to the data packet compression function, so as to reduce the transmission resources.

In some embodiments, the first information is included in a control PDU, a MAC CE, or a first data packet.

For example, the first information is sent by using the control PDU. The control PDU may be a newly introduced control PDU, or an existing control PDU may be reused. Alternatively, the first information is sent by using the MAC CE, and the control PDU may be a newly introduced MAC CE, or an existing MAC CE may be reused. The control PDU or the MAC CE may include an indicator field. The indicator field is used to bear or carry the first information, or the indicator field is used to indicate the first information. The indicator field may be a newly added field in the control PDU or the MAC CE, or a reserved bit in the control PDU or the MAC CE may be used as the indicator field. The first processing manner is indicated by using the control PDU or the MAC CE, so that indication can be clear. Alternatively, the first information may also be included in a data packet. For example, the data packet including the first information is referred to as the first data packet, and the first data packet may be any data packet sent by the first device to a second device. In other words, the first information can be sent by sending the first data packet. In this way, an additional message does not need to be used to send the first information to the second device, thereby helping reduce signaling overheads.

In some embodiments, the control PDU is a PDCP control PDU or an RLC control PDU.

This is only an example. In addition, the control PDU may be another possible control PDU.

In some embodiments, the first information is included in the first data packet, and the first information is indicated by using one or more reserved bits in a packet header of the first data packet.

If the first information is included in the first data packet, as a manner in which the first data packet carries the first information, the first information may occupy the one or more reserved bits in the packet header of the first data packet, or in other words, the one or more reserved bits in the packet header of the first data packet may indicate the first information. In this way, the first information does not need to occupy a location of a payload of the first data packet, and a payload part of the first data packet can normally bear data, thereby reducing impact on data transmission. In addition, a receive end can obtain the first information through parsing the packet header of the first data packet, so that the first processing manner can be quickly known.

In some embodiments, the one or more reserved bits are located in a compression packet header included in the packet header of the first data packet; or the one or more reserved bits are located in the packet header of the first data packet, but are not located in a compression packet header included in the packet header of the first data packet.

For example, the data packet compression function is a UDC function. One or more reserved bits used to indicate the first information may be located in a UDC header included in the packet header of the first data packet, or may be located in the packet header of the first data packet but outside a UDC header included in the packet header. Whether the first information is indicated by using the reserved bit in the compression packet header or the first information is indicated by using the reserved bit outside the compression packet header may be related to a length of an SN of the data packet, or in other words, related to a location of the reserved bit.

For example, if a reserved bit is included in the compression packet header and a reserved bit is included outside the compression packet header, the first information may be indicated by using the reserved bit in the compression packet header, or the first information may be indicated by using the reserved bit outside the compression packet header; if a reserved bit is included in the compression packet header and no reserved bit is included outside the compression packet header, the first information is indicated by using the reserved bit in the compression packet header; or if no reserved bit is included in the compression packet header and a reserved bit is included outside the compression packet header, the first information may be indicated by using the reserved bit outside the compression packet header.

In some embodiments, whether the first information is indicated by using the reserved bit in the compression packet header or the first information is indicated by using the reserved bit outside the compression packet header may also be related to whether the data packet compression function of the first radio bearer is currently in the active state. If the data packet compression function of the first radio bearer is currently in the active state, the packet header of the first data packet sent by the first device over the first radio bearer includes the compression packet header. In this case, the first information may be indicated by using the reserved bit in the compression packet header, or the first information may be indicated by using the reserved bit located in the packet header of the first data packet but outside the compression packet header included in the packet header. If the data packet compression function of the first radio bearer is currently in the inactive state, the packet header of the first data packet sent by the first device over the first radio bearer does not include the compression packet header. In this case, the first information cannot be indicated by using the reserved bit in the compression packet header. Therefore, the first information can be indicated by using the selected reserved bit located in the packet header of the first data packet but outside the compression packet header included in the packet header. It can be learned that a manner of indicating the first information is flexible.

In some embodiments, the first information is used to indicate to use the first processing manner on the first radio bearer starting from the $1^{st}$ data packet sent after the first information; the first information is included in the first data packet, and the first information is used to indicate to use the first processing manner on the first radio bearer starting from the first data packet; the first information further includes indication information, the indication information is used to indicate a serial number of a second data packet, and the first information is used to indicate to use the first processing manner on the first radio bearer starting from the second data packet; or the first information further includes indication information, the indication information is used to indicate a serial number of a second data packet minus 1, and the first information is used to indicate to use the first processing manner on the first radio bearer starting from a next data packet of the second data packet.

The first information may include the indication information, and the indication information may indicate the second data packet, or in other words, indicate the serial number of the second data packet. This case may be understood as that the first information indicates to use the first processing manner on the first radio bearer starting from the second data packet. For example, the indication information may include the serial number of the second data packet, so that the indication information is used to indicate the serial number of the second data packet. Alternatively, the indication information may indicate the serial number of the second data packet minus 1. This case may be understood as that the first information indicates to use the first processing manner on the first radio bearer starting from the next data packet of the second data packet. For example, the indication information may include a value obtained by subtracting 1 from the serial number of the second data packet, so that the indication information can be used to indicate the serial number of the second data packet minus 1. The first information includes the indication information. This indication manner is clear for both the first device and the second device, so that the indication is more accurate. In addition, if the first information includes the indication information, the first information may be included in the control PDU, the MAC CE, or the first data packet.

In some embodiments, the first information may not include the indication information. For example, the first information may indicate to use the first processing manner on the first radio bearer starting from the $1^{st}$ data packet sent after the first information. In this case, the first information may be included in the control PDU, the MAC CE, or the first data packet. Therefore, the second device receiving the first information may determine to use the first processing manner on the first radio bearer starting from the $1^{st}$ data packet received after the first information. For example, if the first information is borne in the control PDU or the MAC CE, the first information may indicate to use the first processing manner on the first radio bearer starting from the $1^{st}$ data packet sent after the control PDU or the MAC CE. For another example, if the first information is borne in the first data packet, the first information may indicate to use the first processing manner on the first radio bearer starting from the $1^{st}$ data packet sent after the first data packet (it should be noted that the $1^{st}$ data packet and the first data packet are different concepts, the first data packet is a data packet, and the $1^{st}$ data packet is the $1^{st}$ data packet transmitted after a moment). In this manner, the first information does not need to include excessive information, thereby helping reduce the signaling overheads.

In some embodiments, the first information may not include the indication information. For example, if the first information is included in the first data packet, the first information may indicate to use the first processing manner on the first radio bearer starting from the $1^{st}$ data packet sent after the first information (or starting from a next data packet of the first data packet); or the first information may indicate to use the first processing manner on the first radio bearer starting from the first data packet. In this manner, the first data packet in which the first information is located may also complete some indication functions, and the first information does not need to include excessive information, thereby helping reduce the signaling overheads.

In some embodiments, the method further includes: after the data packet compression function of the first radio bearer is activated or deactivated, resetting a predefined dictionary corresponding to the first radio bearer, where the predefined dictionary is used to compress, by using the data packet compression function, a data packet transmitted over the first radio bearer.

For example, resetting the predefined dictionary after the data packet compression function of the first radio bearer is activated is equivalent to resetting the predefined dictionary when the data packet compression function starts to be used, so that a buffer state of the first device is consistent with a buffer state of the second device, thereby improving a success rate of data packet compression and decompression. For another example, if the predefined dictionary is reset after the data packet compression function of the first radio bearer is deactivated, the predefined dictionary does not need to be reset again after the data packet compression function of the first radio bearer is re-activated, so that the data packet can be transmitted as soon as possible after the data packet compression function of the first radio bearer is activated.

In some embodiments, the method further includes: sending a first message, where the first message is used to indicate a first capability, and the first capability is a capability of dynamically activating or deactivating a data packet compression function; and receiving a second message, where the second message is used to configure the first radio bearer to be capable of activating or deactivating the data packet compression function.

If the first device (e.g., a device that sends the first information) is the terminal device, and the second device (e.g., a device that receives the first information) is a network device, in some embodiments, the terminal device may send the first message to the network device, and the network device receives the first message from the terminal device. The first message may indicate the first capability, and the first capability is the capability of dynamically activating or deactivating a data packet compression function. For example, if the data packet compression function is the UDC function, the first capability is a capability of dynamically activating or deactivating the UDC function. Further, in some embodiments, the first capability may further include a quantity of radio bearers of which the terminal device supports dynamically activating or deactivating the data packet compression function. The network device may determine, based on the first capability, whether the terminal device supports dynamically activating or deactivating the data packet compression function. In some embodiments, the network device may further determine, based on the first capability, the quantity of radio bearers of which the terminal device can support dynamically activating or deactivating the data packet compression function.

Then, the network device may send the second message to the terminal device, and the terminal device receives the second message from the network device. The second message may be used to configure the first radio bearer to use the first capability, or the second message may be used to configure the first capability for the first radio bearer, or the second message may be used to configure the first radio bearer to be capable of dynamically activating or deactivating the data packet compression function. If the terminal device supports the first capability, for radio bearers corresponding to the terminal device, the network device may configure all or some of these radio bearers to use the first capability. The first radio bearer is, for example, one of the radio bearers corresponding to the terminal device. After receiving the second message, the terminal device may determine that the first radio bearer is capable of using the first capability, so that the terminal device can activate the data packet compression function of the first radio bearer, or can deactivate the data packet compression function of the first radio bearer.

In some embodiments, the second message is further used to configure the data compression function of the first radio bearer to be in the active state, or after the second message is received, the data compression function of the first radio bearer is in the inactive state, where the second message is not used to configure the data compression function of the first radio bearer to be in the active state.

The second message may be used to configure the data packet compression function of the first radio bearer to be in the activated state, or the second message may be used to configure the data packet compression function of the first radio bearer to be in the inactive state. In other words, in addition to configuring that the first radio bearer is capable of using the first capability, the second message may be used to configure an initial state of the data packet compression function of the first radio bearer to be the active state or the inactive state. In this way, the data packet compression function of the first radio bearer may be configured to be the active state or the inactive state without using other signaling, thereby helping reduce the signaling overheads.

In some embodiments, the method further includes: receiving a first message, where the first message is used to indicate a first capability, and the first capability is a capability of dynamically activating or deactivating a data packet compression function.

If the second device (e.g., a device that receives the first information) is a terminal device, and the first device (e.g., a device that sends the first information) is the network device, in some embodiments, the terminal device may send the first message to the network device, and the network device receives the first message from the terminal device. The first message may indicate the first capability, and the first capability is the capability of dynamically activating or deactivating a data packet compression function. For example, if the data packet compression function is the UDC function, the first capability is a capability of dynamically activating or deactivating the UDC function. After receiving the first message from the terminal device, the network device may determine that the radio bearer corresponding to the terminal device is capable of using the first capability, so that the network device can activate the data packet compression function of the first radio bearer, or can deactivate the data packet compression function of the first radio bearer.

In some embodiments, a second communication method is provided. The method includes: receiving first information; and determining, based on the first information, to process a first radio bearer in a first processing manner, where the first processing manner is activating or deactivating a data packet compression function of the first radio bearer.

The method may be performed by a second communication apparatus. The second communication apparatus may be a communication device, or may be a communication apparatus, for example, a chip, that can support the communication device to implement a function required in the method. For example, the second communication apparatus is a second device, or a chip that is disposed in the second device and configured to implement a function of the second device, or another component configured to implement a function of the second device. The second device is, for example, a terminal device or a network device. In the following description process, an example in which the second communication apparatus is the second device is used.

In some embodiments, deactivating a data packet compression function of the first radio bearer indicates changing the data packet compression function of the first radio bearer from an active state to an inactive state; and/or activating a data packet compression function of the first radio bearer indicates changing the data packet compression function of the first radio bearer from an inactive state to an active state, where in the active state, a data packet over the first radio bearer includes a compression packet header, and in the inactive state, a data packet over the first radio bearer does not include a compression packet header.

In some embodiments, the first information is included in a control PDU, a MAC CE, or a first data packet.

In some embodiments, the control PDU is a PDCP control PDU or an RLC control PDU.

In some embodiments, the first information is included in the first data packet, and the first information is indicated by using one or more reserved bits in a packet header of the first data packet.

In some embodiments, the one or more reserved bits are located in a compression packet header included in the packet header of the first data packet; or the one or more reserved bits are located in the packet header of the first data packet, but are not located in a compression packet header included in the packet header of the first data packet.

In some embodiments, the first information is used to indicate to use the first processing manner on the first radio bearer starting from the $1^{st}$ data packet received after the first information; the first information is included in the first data packet, and the first information is used to indicate to use the first processing manner on the first radio bearer starting from the first data packet; the first information further includes indication information, the indication information is used to indicate a serial number of a second data packet, and the first information is used to indicate to use the first processing manner on the first radio bearer starting from the second data packet; or the first information further includes indication information, the indication information is used to indicate a serial number of a second data packet minus 1, and the first information is used to indicate to use the first processing manner on the first radio bearer starting from a next data packet of the second data packet.

In some embodiments, the method further includes: after the data packet compression function of the first radio bearer is activated or deactivated, resetting a predefined dictionary corresponding to the first radio bearer, where the predefined dictionary is used to compress, by using the data packet compression function, a data packet transmitted over the first radio bearer.

In some embodiments, the method further includes: receiving a first message, where the first message is used to indicate a first capability, and the first capability is a capability of dynamically activating or deactivating a data packet compression function; and sending a second message, where the second message is used to configure the first radio bearer to be capable of activating or deactivating the data packet compression function.

In some embodiments, the second message is further used to configure the data compression function of the first radio bearer to be in the active state, or after the second message is sent, the data compression function of the first radio bearer is in the inactive state, where the second message is not used to configure the data compression function of the first radio bearer to be in the active state.

In some embodiments, the method further includes: sending a first message, where the first message is used to indicate a first capability, and the first capability is a capability of dynamically activating or deactivating a data packet compression function.

In some embodiments, a communication apparatus is provided. For example, the communication apparatus is the first communication apparatus described above. The first communication apparatus is configured to perform the method according to various embodiments. In some embodiments, the first communication apparatus may include modules configured to perform the method according to any one of the various embodiments, for example, include a processing module and a transceiver module. For example, the transceiver module may include a sending module and a receiving module. The sending module and the receiving module may be different functional modules, or may be a same functional module but can implement different functions. For example, the first communication apparatus is a communication device, or is a chip or another component disposed in the communication device. For example, the communication device is a first device. The first device is, for example, a terminal device or a network device. The following uses an example in which the first communication apparatus is the first device. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the first communication apparatus is the communication device, the transceiver is implemented, for example, by an antenna, a feeder, and a codec in the communication device. Alternatively, if the first communication apparatus is the chip disposed in the communication device, the transceiver (or the transmitter and the receiver) is, for example, a communications interface in the chip. The communications interface is connected to a radio frequency transceiver component in the communication device, to send and receive information through the radio frequency transceiver component.

The processing module is configured to determine to process a first radio bearer in a first processing manner, where the first processing manner is activating or deactivating a data packet compression function of the first radio bearer.

The transceiver module is configured to send first information, where the first information is used to indicate the first processing manner.

In some embodiments, deactivating a data packet compression function of the first radio bearer indicates changing the data packet compression function of the first radio bearer from an active state to an inactive state; and/or activating a data packet compression function of the first radio bearer indicates changing the data packet compression function of the first radio bearer from an inactive state to an active state, where in the active state, a data packet over the first radio bearer includes a compression packet header, and in the inactive state, a data packet over the first radio bearer does not include a compression packet header.

In some embodiments, the first information is included in a control PDU, a MAC CE, or a first data packet.

In some embodiments, the control PDU is a PDCP control PDU or an RLC control PDU.

In some embodiments, the first information is included in the first data packet, and the first information is indicated by using one or more reserved bits in a packet header of the first data packet.

In some embodiments, the one or more reserved bits are located in a compression packet header included in the packet header of the first data packet; or the one or more reserved bits are located in the packet header of the first data packet, but are not located in a compression packet header included in the packet header of the first data packet.

In some embodiments, the first information is used to indicate to use the first processing manner on the first radio bearer starting from the $1^{st}$ data packet sent after the first information; the first information is included in the first data packet, and the first information is used to indicate to use the first processing manner on the first radio bearer starting from the first data packet; the first information further includes indication information, the indication information is used to indicate a serial number of a second data packet, and the first information is used to indicate to use the first processing manner on the first radio bearer starting from the second data packet; or the first information further includes indication information, the indication information is used to indicate a serial number of a second data packet minus 1, and the first information is used to indicate to use the first processing manner on the first radio bearer starting from a next data packet of the second data packet.

In some embodiments, the processing module is further configured to: after the data packet compression function of the first radio bearer is activated or deactivated, reset a predefined dictionary corresponding to the first radio bearer, where the predefined dictionary is used to compress, by using the data packet compression function, a data packet transmitted over the first radio bearer.

In some embodiments, if the first device is a terminal device, and the second device (e.g., a device that receives the first information) is the network device, the transceiver module is further configured to: send a first message, where the first message is used to indicate a first capability, and the first capability is a capability of dynamically activating or deactivating a data packet compression function; and receive a second message, where the second message is used to configure the first radio bearer to be capable of activating or deactivating the data packet compression function.

In some embodiments, the second message is further used to configure the data compression function of the first radio bearer to be in the active state, or after the second message is received, the data compression function of the first radio bearer is in the inactive state, where the second message is not used to configure the data compression function of the first radio bearer to be in the active state.

In some embodiments, if the first device is a network device, and the second device (e.g., a device that receives the first information) is the terminal device, the transceiver module is further configured to receive a first message, where the first message is used to indicate a first capability, and the first capability is a capability of dynamically activating or deactivating a data packet compression function.

In some embodiments, a communication apparatus is provided. For example, the communication apparatus is the second communication apparatus described above. The second communication apparatus is configured to perform the method according to any one of the various embodiments. In one embodiment, the second communication apparatus may include modules configured to perform the method according to any one of the various embodiments, for example, include a processing module and a transceiver module. For example, the transceiver module may include a sending module and a receiving module. The sending module and the receiving module may be different functional modules, or may be a same functional module but can implement different functions. For example, the second communication apparatus is a communication device, or is a chip or another component disposed in the communication device. For example, the communication device is a second device. The second device is, for example, a network device or a terminal device. The following uses an example in which the second communication apparatus is the second device. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the second communication apparatus is the communication device, the transceiver is implemented, for example, by an antenna, a feeder, and a codec in the communication device. Alternatively, if the second communication apparatus is the chip disposed in the communication device, the transceiver (or the transmitter and the receiver) is, for example, a communications interface in the chip. The communications interface is connected to a radio frequency transceiver component in the communication device, to send and receive information through the radio frequency transceiver component.

The transceiver module is configured to receive first information.

The processing module is configured to determine, based on the first information, to process a first radio bearer in a first processing manner, where the first processing manner is activating or deactivating a data packet compression function of the first radio bearer.

In some embodiments, deactivating a data packet compression function of the first radio bearer indicates changing the data packet compression function of the first radio bearer from an active state to an inactive state; and/or activating a data packet compression function of the first radio bearer indicates changing the data packet compression function of the first radio bearer from an inactive state to an active state, where in the active state, a data packet over the first radio bearer includes a compression packet header, and in the inactive state, a data packet over the first radio bearer does not include a compression packet header.

In some embodiments, the first information is included in a control PDU, a MAC CE, or a first data packet.

In some embodiments, the control PDU is a PDCP control PDU or an RLC control PDU.

In some embodiments, the first information is included in the first data packet, and the first information is indicated by using one or more reserved bits in a packet header of the first data packet.

In some embodiments, the one or more reserved bits are located in a compression packet header included in the packet header of the first data packet; or the one or more reserved bits are located in the packet header of the first data packet, but are not located in a compression packet header included in the packet header of the first data packet.

In some embodiments, the first information is used to indicate to use the first processing manner on the first radio bearer starting from the $1^{st}$ data packet received after the first information; the first information is included in the first data packet, and the first information is used to indicate to use the first processing manner on the first radio bearer starting from the first data packet; the first information further includes indication information, the indication information is used to indicate a serial number of a second data packet, and the first information is used to indicate to use the first processing manner on the first radio bearer starting from the second data packet; or the first information further includes indication information, the indication information is used to indicate a serial number of a second data packet minus 1, and the first information is used to indicate to use the first processing manner on the first radio bearer starting from a next data packet of the second data packet.

In some embodiments, the processing module is further configured to: after the data packet compression function of the first radio bearer is activated or deactivated, reset a predefined dictionary corresponding to the first radio bearer, where the predefined dictionary is used to compress, by using the data packet compression function, a data packet transmitted over the first radio bearer.

In some embodiments, if a first device (e.g., a device that sends the first information) is a terminal device, and the second device is the network device, the transceiver module is further configured to: receive a first message, where the first message is used to indicate a first capability, and the first capability is a capability of dynamically activating or deactivating a data packet compression function; and send a second message, where the second message is used to configure the first radio bearer to be capable of activating or deactivating the data packet compression function.

In some embodiments, the second message is further used to configure the data compression function of the first radio bearer to be in the active state, or after the second message is sent, the data compression function of the first radio bearer is in the inactive state, where the second message is not used to configure the data compression function of the first radio bearer to be in the active state.

In some embodiments, if a first device (e.g., a device that sends the first information) is a network device, and the second device is the terminal device, the transceiver module is further configured to send a first message, where the first message is used to indicate a first capability, and the first capability is a capability of dynamically activating or deactivating a data packet compression function.

In some embodiments, a communication apparatus is provided. For example, the communication apparatus is the first communication apparatus described above. The communication apparatus includes a processor and a communications interface. The communications interface may be used to communicate with another apparatus or device. In some embodiments, the communication apparatus may further include a memory, configured to store computer instructions. The processor and the memory are coupled to each other, to implement the method according to any one of the various embodiments. Alternatively, the first communication apparatus may not include a memory, and the memory may be located outside the first communication apparatus. The processor, the memory, and the communications interface are coupled to each other, to perform the method according to any one of the various embodiments. For example, when the processor executes the computer instructions stored in the memory, the first communication apparatus is enabled to perform the method according to any one of the various embodiments. For example, the first communication apparatus is a communication device, or is a chip or another component disposed in the communication device. For example, the communication device may be a terminal device or a network device.

If the first communication apparatus is the communication device, the communications interface is implemented, for example, by a transceiver (or a transmitter and a receiver) in the communication device, and the transceiver is implemented, for example, by an antenna, a feeder, and a codec in the communication device. Alternatively, if the first communication apparatus is the chip disposed in the communication device, the communications interface is, for example, an input/output interface such as an input/output pin of the chip. The communications interface is connected to a radio frequency transceiver component in the communication device, to send and receive information through the radio frequency transceiver component.

According to some embodiments, a communication apparatus is provided. For example, the communication apparatus is the second communication apparatus described above. The communication apparatus includes a processor and a communications interface. The communications interface may be used to communicate with another apparatus or device. In some embodiments, the communication apparatus may further include a memory, configured to store computer instructions. In one embodiment, the second communication apparatus may not include a memory, and the memory may be located outside the second communication apparatus. The processor, the memory, and the communications interface are coupled to each other, to perform the method according to any one of the various embodiments. For example, when the processor executes the computer instructions stored in the memory, the second communication apparatus is enabled to perform the method according to any one of the various embodiments. For example, the second communication apparatus is a communication device, or is a chip or another component disposed in the communication device. For example, the communication device is a network device or a terminal device.

If the second communication apparatus is the communication device, the communications interface is implemented, for example, by a transceiver (or a transmitter and a receiver) in the communication device, and the transceiver is implemented, for example, by an antenna, a feeder, and a codec in the communication device. Alternatively, if the second communication apparatus is the chip disposed in the communication device, the communications interface is, for example, an input/output interface such as an input/output pin of the chip. The communications interface is connected to a radio frequency transceiver component in the communication device, to send and receive information through the radio frequency transceiver component.

According to some embodiments, a computer-readable storage medium is provided. The computer-readable storage medium is used to store a computer program. When the computer program is run on a computer, the computer is enabled to perform the method according to any one of the various embodiments.

According to some embodiments, a computer-readable storage medium is provided. The computer-readable storage medium is used to store a computer program. When the computer program is run on a computer, the computer is enabled to perform the method according to any one of the various embodiments.

According to some embodiments, a computer program product including instructions is provided. The computer program product is configured to store a computer program. When the computer program is run on a computer, the computer is enabled to perform the method according to any one of the various embodiments.

According to some embodiments, a computer program product including instructions is provided. The computer program product is configured to store a computer program. When the computer program is run on a computer, the computer is enabled to perform the method according to any one of the various embodiments.

In embodiments of this application, the data packet compression function can be deactivated. For example, when considering that a data packet compression function does not need to be used on a radio bearer, a transmit end may deactivate the data packet compression function of the radio bearer. In this way, a packet header of a data packet transmitted over the radio bearer no longer includes information corresponding to the data packet compression function, thereby reducing transmission resources.

DESCRIPTION OF EMBODIMENTS

Figures 1, 2A:
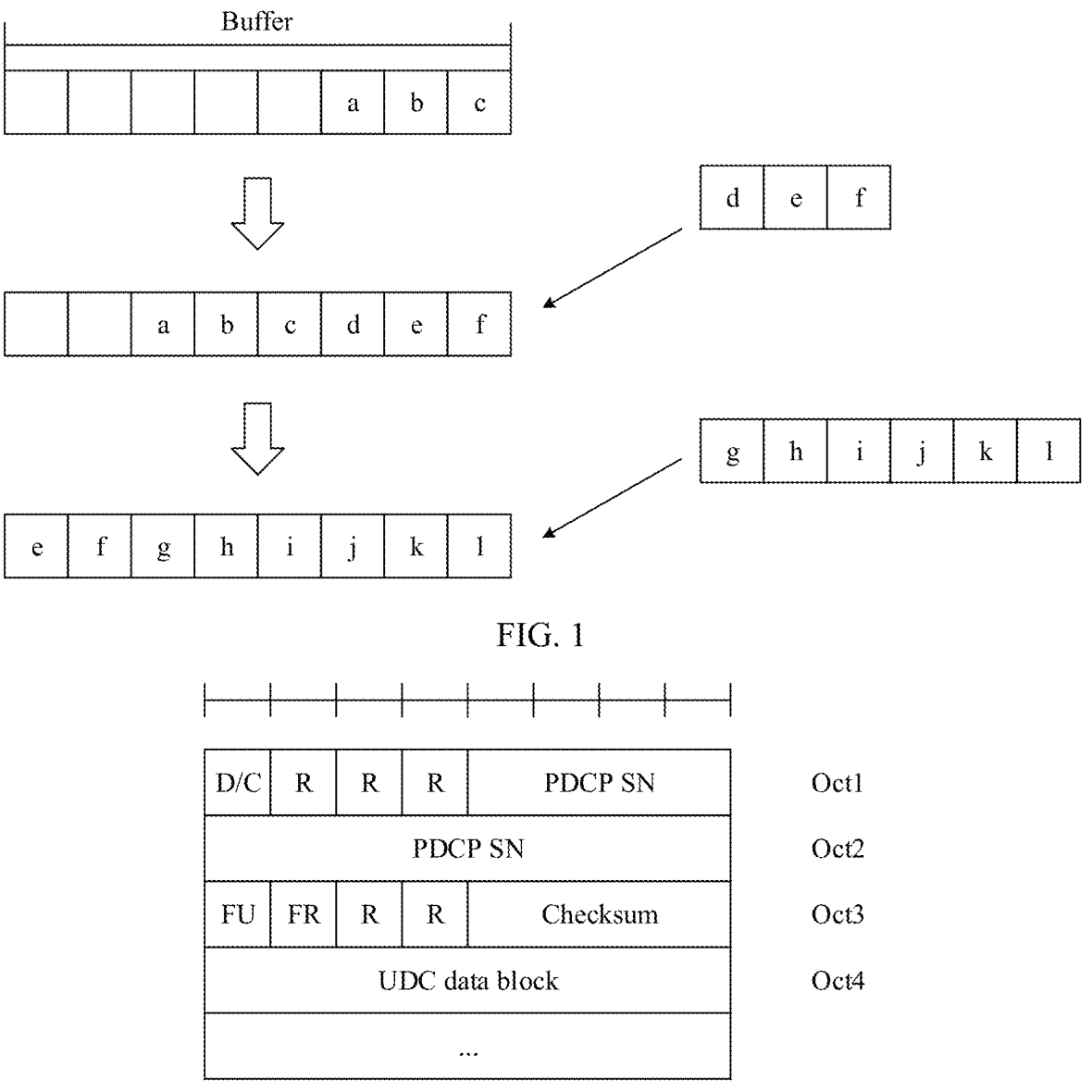
FIG. 1 is a schematic diagram of a UDC technology.
FIG. 2A is a schematic diagram of a packet header of a data packet.

To make the objectives, technical solutions and advantages of embodiments of this application clearer, the following further describes embodiments of this application in detail with reference to accompanying drawings.

In the following descriptions, some terms in embodiments of this application are described, to help a person skilled in the art have a better understanding.

(1) Terminal device: A terminal device includes a device that provides a voice and/or data connectivity for a user. In one embodiment, the terminal device includes the device that provides the voice for the user, includes the device that provides the data connectivity for the user, or includes the device that provides the voice and the data connectivity for the user. For example, the terminal device may include a handheld device having a wireless connection function or a processing device connected to a wireless modem. The terminal device may communicate with a core network through a radio access network (RAN), and exchange a voice or data with the RAN, or interact a voice and data with the RAN. The terminal device may include user equipment (UE), a wireless terminal device, a mobile terminal device, a device-to-device (D2D) terminal device, a vehicle to everything (V2X) terminal device, a machine-to-machine/ machine type communication (M2M/MTC) terminal device, an internet of things (IoT) terminal device, a light terminal device (UE), a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

Through example but not limitative description, in embodiments of this application, the terminal device may alternatively be a wearable device. The wearable device may also be referred to as a wearable intelligent device, an intelligent wearable device, or the like, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is more than a hardware device. The wearable device implements powerful functions through software support, data exchange, and cloud interaction. In a broad sense, wearable intelligent devices include full-featured and large-sized devices that can implement all or some functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

If being located in a vehicle (for example, placed in the vehicle or installed in the vehicle), the various terminal devices described above may all be considered as vehicle-mounted terminal devices. For example, the vehicle-mounted terminal device is also referred to as an on-board unit (OBU).

In embodiments of this application, the terminal device may further include a relay. Alternatively, it may be understood that any device that can perform data communication with a base station may be considered as a terminal device.

In embodiments of this application, an apparatus configured to implement a function of a terminal device may be a terminal device, or may be an apparatus, for example, a chip system, that can support the terminal device in implementing the function. The apparatus may be mounted in the terminal device. In embodiments of this application, the chip system may include a chip, or may include a chip and another discrete component. In the technical solutions provided in embodiments of this application, the technical solutions provided in embodiments of this application are described by using an example in which the terminal device is the apparatus for implementing the function of the terminal.

(2) Network device: A network device includes, for example, an access network (access network, AN) device such as a base station (for example, an access point), and may be a device that is in an access network and that communicates with a wireless terminal device over an air interface through one or more cells. In some embodiments, the network device is, for example, a road side unit (RSU)

in a vehicle to everything (V2X) technology. The base station may be configured to perform mutual conversion between a received over-the-air frame and an IP packet, to serve as a router between a terminal device and a remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (eNB, or e-NodeB, evolved NodeB) in a long term evolution (LTE) system or a long term evolution-advanced (LTE-A) system, may include a next generation NodeB (gNB) in a 5th generation (5G) mobile communication technology NR system (also referred to as an NR system for short), or may include a centralized unit (CU) and a distributed unit (DU) in a cloud radio access network (Cloud RAN) system. This is not limited in embodiments of this application.

The network device may further include a core network device. The core network device includes, for example, an access and mobility management function (AMF) or a user plane function (UPF). Because embodiments of this application mainly relate to an access network device, the network device below is an access network device unless otherwise specified.

In embodiments of this application, an apparatus configured to implement a function of a network device may be a network device, or may be an apparatus, for example, a chip system, that can support the network device in implementing the function. The apparatus may be mounted in the network device. In the technical solutions provided in embodiments of this application, the technical solutions provided in embodiments of this application are described by using an example in which the network device is the apparatus for implementing the function of the network device.

(3) Terms "system" and "network" may be used interchangeably in embodiments of this application. "At least one" means one or more, and "a plurality of" means two or more. "And/Or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural.

In addition, unless otherwise stated, in embodiments of this application, ordinal numbers such as "first" and "second" are intended to distinguish between a plurality of objects, and not intended to limit an order, a time sequence, a priority, or importance of the plurality of objects. For example, a first data packet and a second data packet are merely used to distinguish between different data packets, but do not indicate a difference in content, priorities, a sending order, importance, or the like of the two data packets.

The foregoing describes concepts of some terms in embodiments of this application. The following describes technical features in embodiments of this application.

In AM transmission in an LTE system, a UDC technology is introduced and implemented at a PDCP layer. For some data packets with a large amount of repeated content, for example, data packets for transmitting a SIP in a VoLTE, the UDC technology is used to transmit different parts between the data packets, so as to reduce a to-be-transmitted data amount.

In UDC, a terminal device serves as a transmit end to compress a data packet, and a network device serves as a receive end to decompress the data packet. Both compression and decompression are performed based on a same buffer state that is jointly maintained by the transmit end and the receive end. The buffer state may indicate content included in a buffer (or information included in a buffer). When compressing the data packet, the transmit end performs the compression based on a buffer state. After successfully compressing the data packet, the transmit end places original information (before compression) of the currently compressed data packet from a backend of the buffer into the buffer. When the $1^{st}$ data packet is compressed, the buffer may not include information about a previous data packet. In this case, the transmit end may perform compression based on preset information. For example, the preset information is a predefined dictionary. For example, as shown in FIG. 1, a buffer includes "abc". For example, "abc" is a predefined dictionary. When a transmit end needs to compress a data packet "def", the transmit end may perform the compression based on "abc". After compressing the data packet "def" and obtaining a compressed data packet 1, the transmit end may place "def" from a backend of the buffer into the buffer. Then, when the transmit end needs to compress a data packet "ghijkl", the transmit end may perform the compression based on "abcdef" in the buffer. In other words, compression is performed based on all content in the buffer each time. After compressing the data packet "ghijkl" and obtaining a compressed data packet 2, the transmit end may place the data packet "ghijkl" from the backend of the buffer into the buffer. Because storage space of the buffer is limited, "abcd" is squeezed out of the buffer according to a first in first out (FIFO) principle. In this case, if the transmit end needs to compress another data packet, the compression is performed based on "efghijkl" included in the buffer. For a receive end, after receiving the compressed data packet 1, the receive end may perform decompression based on the predefined dictionary "abc" in the buffer to obtain the data packet "def", and place the data packet "def" from the backend of the buffer into the buffer. After receiving the data packet 2, the receive end may perform decompression based on information "abcdef" in the buffer to obtain the data packet "ghijkl", and place the data packet "ghijkl" from the backend of the buffer into the buffer. In this case, "abcd" is squeezed out of the buffer. It can be learned that a buffer state at the receive end keeps consistent with a buffer state at the transmit end. This can ensure that the receive end can correctly perform decompression.

Whether a UDC function needs to be configured for a DRB corresponding to the terminal device is determined by the network device. Because the network device does not know whether UDC needs to be performed on uplink data from the terminal device, currently, the network device configures the UDC function for the configured DRB when configuring the DRB for the terminal device, to meet a requirement that the terminal device may use the UDC function. After the network device sends, to the terminal device, configuration information used to configure the UDC function for the terminal device, the terminal device enables the UDC function. After the UDC function is configured for the DRB, a location of one byte in a packet header of a data packet transmitted over the DRB is allocated to the UDC function, and the one byte may be referred to as a UDC header. Whether to compress the data packet by using the UDC technology depends on the terminal device. The terminal device may consider that the data packet does not need to be compressed. For example, the terminal device may not compress the data packet at an initial stage of UDC configuration, or when some packets do not generate a compression gain. However, even if the terminal device does not compress the data packet, the UDC function of the DRB still maintains an enabled state, and the UDC header is still included in the packet header of the data packet sent by the terminal device. This wastes transmission resources. In addition, a certain power consumption is required when the terminal device enables the UDC function. If the terminal device actually does not need to compress the data packet, enabling the UDC function causes power waste.

Figure 2B:
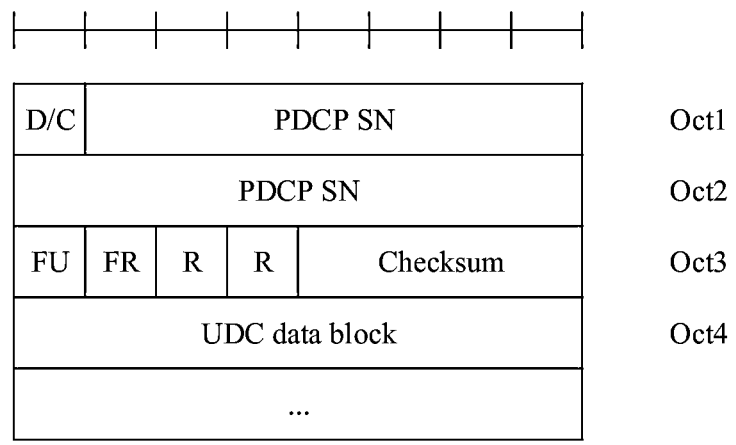
FIG. 2B is another schematic diagram of a packet header of a data packet.

For example, refer to FIG. 2A and FIG. 2B. FIG. 2A and FIG. 2B show two examples of a packet header of a data packet. An uppermost grid in each of FIG. 2A and FIG. 2B indicates one bit. Oct indicates octal. For example, Oct1 indicates the first byte, Oct2 indicates the second byte, Oct3 indicates the third byte, and Oct4 indicates the fourth byte. FIG. 2A shows a location of a UDC header in the data packet whose sequence number (SN) length is 12 bits in the packet header of the data packet, where the UDC header occupies one byte corresponding to Oct3 in FIG. 2A. FIG. 2B shows a location of a UDC header in the packet header of the data packet whose SN length is 15 bits, where the UDC header occupies one byte corresponding to Oct3 in FIG. 2B. In addition, in FIG. 2A and FIG. 2B, D/C indicates data (D)/control (C), R indicates a reserved bit, PDCP SN indicates an SN used to bear the data packet, FR indicates whether a buffer is reset, FU may indicate whether the data packet is compressed, and a checksum is used to check the data packet. If the data packet is a data packet compressed through UDC, a UDC data block is used to bear compressed data in the data packet; or if the data packet is not compressed through UDC, the UDC data block is used to carry uncompressed data in the data packet.

After the UDC function of the DRB is configured, if the terminal device considers that the UDC function of the DRB needs to be disabled, an intra-cell handover procedure is performed. After the UDC function of the DRB is disabled, the packet header of the data packet transmitted over the DRB does not include the UDC header. The intra-cell handover indicates that the terminal device performs cell handover, and a target cell and a source cell are a same cell. After the intra-cell handover is performed, the network device reconfigures a DRB for the terminal device, and the network device does not configure a UDC function for the DRB. If the UDC function is not configured for the DRB, there is no need to reserve a location for the UDC header in the packet header of the data packet transmitted over the DRB, in other words, the packet header of the data packet transmitted over the DRB does not include the UDC header. The UDC function of the DRB can be disabled in this way. After the UDC function of the DRB is disabled, it is equivalent to that the UDC function is not configured for the DRB. If the UDC function of the DRB needs to be enabled again, the network device further needs to resend, to the terminal device, the configuration information used to configure the UDC function for the DRB.

It can be learned that the UDC header in the packet header of the data packet can be currently removed only by using the intra-cell handover procedure. The process is complex, time-consuming, and has low efficiency. In addition, one or more DRBs may be configured for one terminal device. For example, if a plurality of DRBs are configured for one terminal device, the terminal device only needs to disable a UDC function of one of the DRBs. The terminal device performs the intra-cell handover procedure. After the intra-cell handover is performed, the network device reconfigures all the DRBs for the terminal device. This is equivalent to that the network device needs to perform reconfiguration on a DRB whose UDC function does not need to be disabled. This also causes burden over the network device, and affects normal communication of another DRB.

In view of this, the technical solutions in embodiments of this application are provided. In embodiments of this application, a data packet compression function of one radio bearer can be activated or deactivated. If the data packet compression function of the radio bearer is deactivated, a packet header of a data packet transmitted over the radio bearer no longer includes a compression packet header. This can reduce transmission resources. In other words, if the first device considers that the data packet compression function does not need to be used for the first radio bearer, the first device does not need to disable the data packet compression function of the first radio bearer, and only needs to deactivate the data packet compression function of the first radio bearer. Even if the data packet compression function of the radio bearer is deactivated, the radio bearer still has the data packet compression function, that is, configuration of the data packet compression function is not removed with a deactivation operation. Therefore, if the data packet compression function of the radio bearer needs to be re-activated after the data packet compression function of the radio bearer is deactivated, the data packet compression function of the radio bearer only needs to be activated, and the network device does not need to reconfigure the packet compression function for the radio bearer. This reduces a configuration process of the network device, and also reduces signaling overheads. In addition, to activate or deactivate the data packet compression function of the radio bearer, an intra-cell handover procedure does not need to be performed. This simplifies a process of deactivating the data packet compression function, reduces required time, and improves efficiency. The intra-cell handover procedure does not need to be performed, and this reduces signaling interaction, and also reduces transmission overheads. In addition, because the operation of activating or deactivating the data packet compression function can be performed on the radio bearer in a targeted manner without performing the intra-cell handover procedure, another radio bearer is not affected when only one radio bearer needs to be operated. This reduces burden over the network device and the terminal device, and can ensure normal communication of another radio bearer as much as possible.

In addition, in embodiments of this application, the data packet compression function can be activated when required, rather than activated when the radio bearer is configured. When the data packet compression function is configured for the radio bearer, if the data packet compression function is not activated, the packet header of the data packet transmitted over the radio bearer does not include information (for example, a UDC header) corresponding to the data packet compression function, thereby reducing the transmission resources. Deactivating the data packet compression function can also reduce power consumption of the terminal device. In addition, if the data packet compression function of the radio bearer is deactivated for a receive end, the receive end does not need to parse the UDC header when parsing the data packet transmitted over the radio bearer, thereby reducing receiving complexity.

The technical solutions provided in embodiments of this application may be applied to a 4th generation (5G) mobile communication technology system, for example, an LTE system; may be applied to a 5G system, for example, an NR system; or may be applied to a next generation mobile communications system or another similar communications system, provided that one entity can send a data packet to another entity and a transmit end entity can compress the data packet. In addition, an air-interface communication process between the network device and the terminal device is used as an example in a description process of embodiments of this application. Actually, the technical solutions provided in embodiments of this application may also be applied to a sidelink (SL), provided that one terminal device can send a data packet to another terminal device and a transmit end terminal device can compress the data packet. For example, the technical solutions provided in embodiments of this application may be applied to a device-to-device (D2D) scenario, an NR D2D scenario, or an LTE D2D scenario; or may be applied to a vehicle to everything (V2X) scenario, an NR V2X scenario, or an LTE V2X scenario, for example, may be applied to an internet of vehicles, such as V2X, LTE-V, and vehicle-to-vehicle (V2V), or may be used in fields such as intelligent driving and intelligent connected vehicles.

Figure 3A:
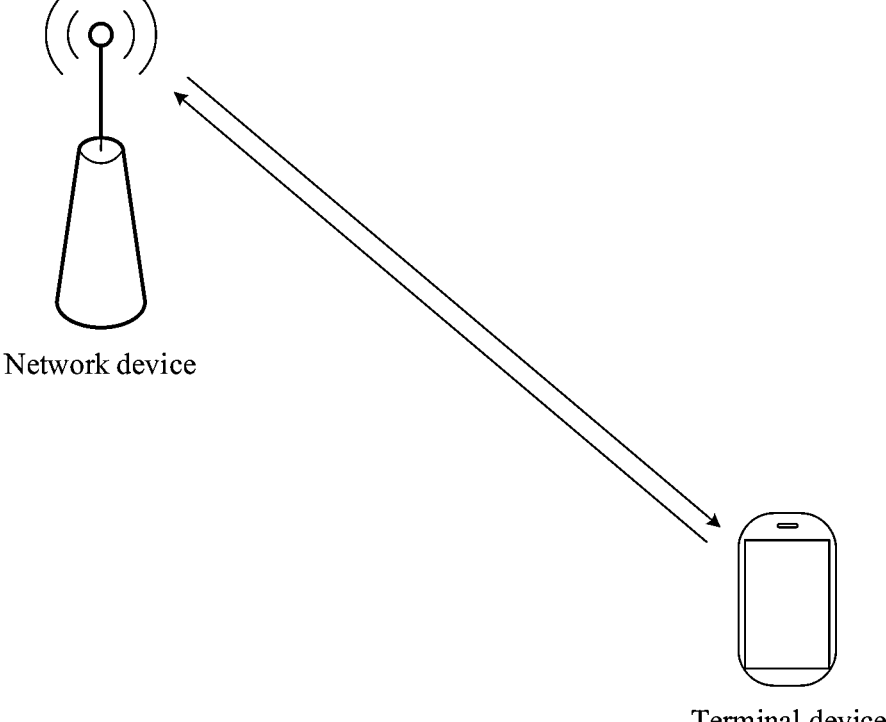
FIG. 3A is a schematic diagram of an application scenario according to some embodiments.

FIG. 3A shows an application scenario according to an embodiment of this application. In FIG. 3A, one network device and one terminal device are included. For example, the network device works in an evolved universal mobile telecommunications system terrestrial radio access (E-UTRA) system, or works in an NR system. Certainly, in embodiments of this application, one network device may serve a plurality of terminal devices. One terminal device is merely used as an example in FIG. 3A.

In addition, an actual application scenario according to an embodiment of this application is considered. When a user holds a terminal device and needs to perform an operation such as making a voice over long-term evolution (VoLTE)/voice over new radio (VoNR) call or accessing the internet by using data traffic (for example, initiating a live broadcast, playing a game, or accessing the internet), the user needs to connect a network. At an initial stage of accessing the network, the terminal device usually needs to report, to a base station, whether the terminal device has a capability of supporting data compression. When determining that the terminal device has the capability of supporting the data compression, the base station may determine, based on a service initiated by the user, whether to configure a data compression-related parameter for the terminal device. When the base station configures that the terminal device can perform the data compression, for example, can perform UDC, the terminal device may use a UDC manner in uplink transmission, for example, in a process of initiating a VoLTE/VoNR call or initiating a live broadcast. In this case, the terminal device may perform the UDC by using a method provided in embodiments of this application. This can reduce or even avoid a data packet loss caused by compression of uplink data. Likewise, the method provided in embodiments of this application may also be used for compression of downlink data, to reduce or even avoid a data packet loss caused by compression of the downlink data.

Figure 3B:
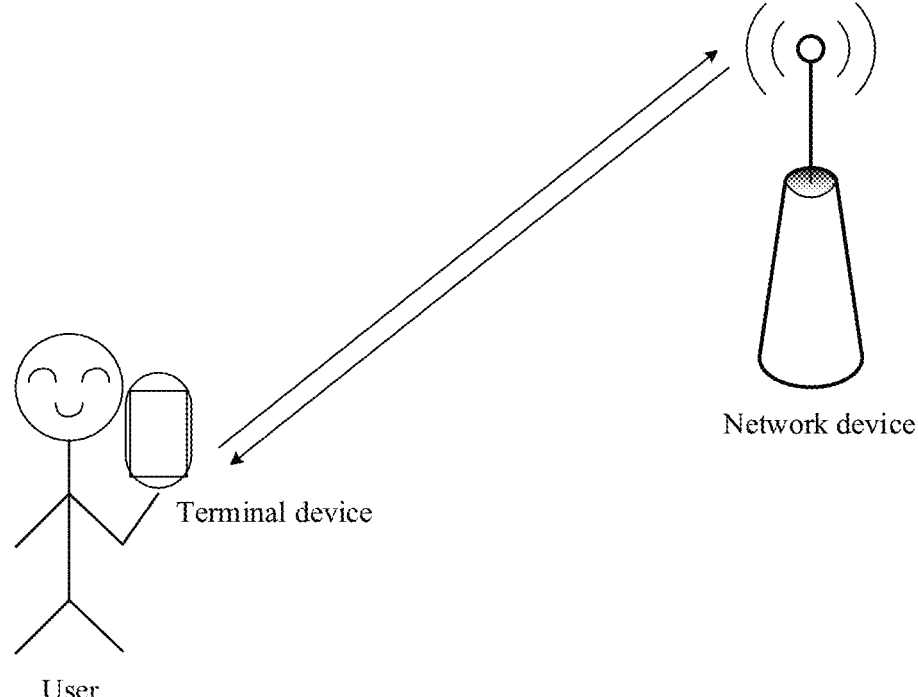
FIG. 3B is a schematic diagram of another application scenario according to some embodiments.

The actual application scenario is considered. FIG. 3B is also a schematic diagram of an application scenario according to an embodiment of this application. FIG. 3B shows an example in which a user holds a terminal device to initiate a VoLTE/VoNR call.

The network device in FIG. 3A or FIG. 3B is, for example, a base station. The network device corresponds to a different device in a different system. For example, in a 5G system, the network device may correspond to a network device in a 5G system, for example, an eNB, and in a 5G system, the network device correspond to a network device in a 5G system, for example, a gNB. In the 5G system, the network device may be a device on a hybrid network constituted by an LTE network device and an NR network device, and the network device and the terminal device form mixed radio-dual connectivity (MR-DC). Certainly, the technical solutions provided in embodiments of this application may also be applied to a future mobile communications system. Therefore, the network device in FIG. 3A or FIG. 3B may also correspond to a network device in the future mobile communications system. FIG. 3A or FIG. 3B shows an example in which the network device is the base station. Actually, with reference to the foregoing descriptions, the network device may alternatively be a device such as an RSU.

In addition, the solutions provided in embodiments of this application may be applied to air-interface communication between the network device and the terminal device, or may be applied to sidelink communication. Therefore, communication in embodiments of this application is not limited to communication between the network device and the terminal device, may be communication between the network devices, or may be communication between the terminal devices. For example, a first device in embodiments of this application may be a network device or a terminal device, a second device in embodiments of this application may be a network device or a terminal device, and a combination manner of types of the first device and the second device is not limited.

The following describes, with reference to the accompanying drawings, the technical solutions provided in embodiments of this application.

Figure 4A:
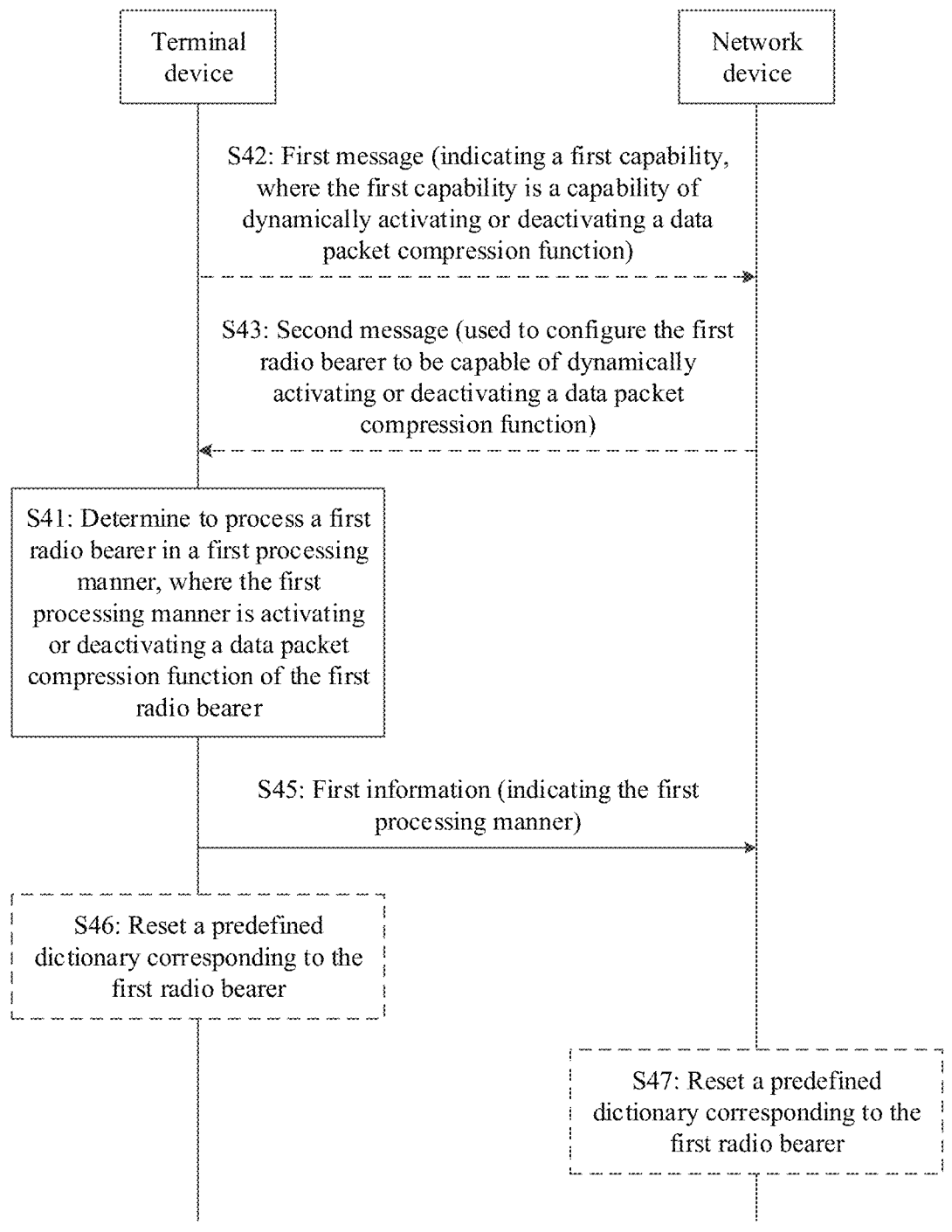
FIG. 4A is a flowchart of a communication method according to some embodiments.
Figures 4B, 5:
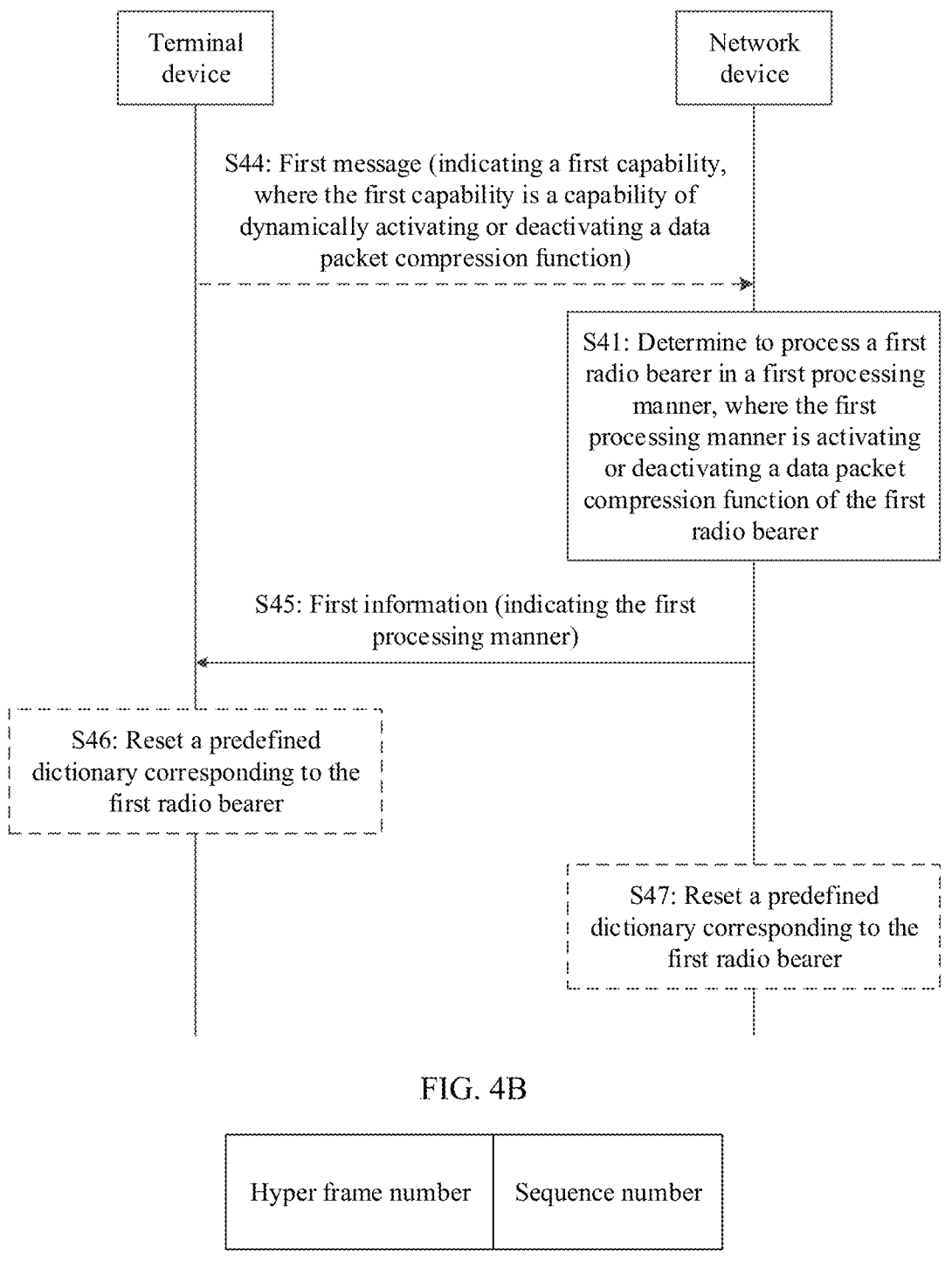
FIG. 4B is another flowchart of a communication method according to some embodiments.
FIG. 5 is a schematic diagram of composition of a count value of a data packet.

An embodiment of this application provides a communication method. FIG. 4A or FIG. 4B is a flowchart of the method. FIG. 4A shows an example of an uplink process, and FIG. 4B shows an example of a downlink process. In the following descriptions, an example in which the method is applied to a network architecture shown in FIG. 3A or FIG. 3B is used.

For ease of description, the following uses an example in which the method is performed by a first device and a second device. An example in which this embodiment is applied to the network architecture shown in FIG. 3A or FIG. 3B is used. Therefore, if the technical solutions in embodiments of this application are applied to an uplink process, the first device described below may be the terminal device in the network architecture shown in FIG. 3A or FIG. 3B, and the second device described below may be the network device in the network architecture shown in FIG. 3A or FIG. 3B. Alternatively, if the technical solutions in embodiments of this application are applied to a downlink process, the first device described below may be the network device in the network architecture shown in FIG. 3A or FIG. 3B, and the second device described below may be the network device in the terminal architecture shown in FIG. 3A or FIG. 3B. It should be noted that the technical solutions provided in embodiments of this application may also be applied to a sidewalk process. For example, the first device described below may be replaced with a terminal device 1, and the second device described below may be replaced with a terminal device 2. In addition, FIG. 4A shows the example of the uplink process. Therefore, in FIG. 4A, the first device is the terminal device, and the second device is the network device. FIG. 4B shows the example of the downlink process. Therefore, in FIG. 4B, the first device is the network device, and the second device is the terminal device.

S41: The first device determines to process a first radio bearer in a first processing manner. The first processing manner is activating a data packet compression function of the first radio bearer or deactivating a data packet compression function of the first radio bearer.

The first radio bearer may be a DRB or a signaling radio bearer (SRB).

If the technical solutions in embodiments of this application are applied to the uplink process, the data packet compression function may be a UDC function. However, if the technical solutions in embodiments of this application are applied to the downlink process, the sidelink process, or the like, the data packet compression function may be another corresponding compression function.

If the first device is the terminal device and the second device is the network device, the first radio bearer may be a radio bearer configured by the second device for the first device; or if the first device is the network device and the second device is the terminal device, the first radio bearer may be a radio bearer configured by the first device for the second device. For example, if the network device may configure one radio bearer for the terminal device, the radio bearer may be the first radio bearer; or if the network device may configure a plurality of radio bearers for the terminal device, the first radio bearer may be any one of the plurality of radio bearers.

Deactivating a data packet compression function of the first radio bearer may indicate changing the data packet compression function of the first radio bearer from an active state to an inactive state. Activating a data packet compression function of the first radio bearer may indicate changing the data packet compression function of the first radio bearer from an inactive state to an active state. When the data packet compression function of the first radio bearer is in the active state, a packet structure of a data packet over the first radio bearer includes a compression packet header. When the data packet compression function of the first radio bearer is in the inactive state, the packet structure of the data packet over the first radio bearer does not include the compression packet header. It may be understood that, when the data packet compression function of the first radio bearer is in the inactive state, the packet structure of the data packet over the first radio bearer is the same as a packet structure of a data packet over a radio bearer for which a data packet compression function is not configured, and neither includes the compression packet header. For example, if the data packet compression function is the UDC function, the compression packet header may be a UDC header; if the data packet compression function is another function, the compression packet header may be another corresponding compression packet header.

In addition, after the data packet compression function of the first radio bearer is activated, S45 to be described below may be performed, that is, the first device sends first information to the second device, so that the second device can learn that the data packet compression function of the first radio bearer is activated. In this case, if receiving the data packet sent by the first device over the first radio bearer, the second device can determine that a packet header of the data packet includes the compression packet header. Likewise, after the data packet compression function of the first radio bearer is deactivated, S45 to be described later may also be performed, that is, the first device sends first information to the second device, so that the second device can learn that the data packet compression function of the first radio bearer is deactivated. In this case, if receiving the data packet sent by the first device over the first radio bearer, the second device can determine that a packet header of the data packet does not include the compression packet header. In this way, the second device can determine a manner of parsing the data packet, thereby improving a receiving success rate of the second device.

In addition, in the conventional technology, after a UDC function is configured for a DRB, regardless of whether a terminal device uses the UDC function to send a data packet, a packet header of the data packet transmitted over the DRB always includes a UDC header. Therefore, the UDC header includes one bit, used to indicate whether the terminal device compresses the data packet. For example, refer to FIG. 2A or FIG. 2B. "FU" is used to indicate whether the terminal device compresses the data packet. However, in this embodiment of this application, if the terminal device does not use the data packet compression function for the first radio bearer, the terminal device directly deactivates the data packet compression function of the first radio bearer. Therefore, there is no need to indicate, in the compression packet header included in the packet header of the data packet transmitted over the first radio bearer, whether the data packet is compressed. This can save a bit in the compression packet header, for example, the bit may be used for other purposes, thereby improving utilization of the compression packet header.

It should be noted that, in this embodiment of this application, regardless of whether the data packet compression function of the first radio bearer is in the active state or the inactive state, the data packet compression function is configured for the first radio bearer, that is, configuration of the data packet compression function of the first radio bearer is not removed with deactivation of the data packet compression function. In this embodiment of this application, the compression packet header can be removed from the packet header of the data packet transmitted over the first radio bearer by deactivating the data packet compression function of the first radio bearer. However, in a current practice, if the UDC header in the packet header of the data packet transmitted over the DRB needs to be removed, only the UDC function of the DRB can be disabled. To disable the UDC function of the DRB, a network device needs to not configure the UDC function for the DRB at all. This is certainly a complex process. In addition, in this embodiment of this application, because configuration of the data packet compression function of the first radio bearer is not changed, after the data packet compression function of the first radio bearer is deactivated, if the data packet compression function of the first radio bearer needs to be re-activated, only S41 needs to be performed, and the network device does not need to reconfigure the data packet compression function for the first radio bearer, thereby reducing a configuration process. In addition, if the data packet compression function of the first radio bearer needs to be deactivated, configuration of the data packet compression function of the first radio bearer does not need to be changed, and S41 can be performed. An intra-cell handover procedure does not need to be performed, thereby simplifying a process of deactivating the data packet compression function.

Whether the data packet compression function needs to be used for the radio bearer may be determined by a transmit end (e.g., the first device) of the data packet. For example, in a scenario in which a user plays some games on a terminal device, when a DRB established for the game starts, there is a large difference between data packets transmitted for previous game data update, and there is basically no compression gain. In this case, the DRB may not need to activate a data packet compression function. When the game opens and starts, the difference between transmitted data packets is small, and a good compression gain can be obtained. In this case, the DRB can activate the data packet compression function. In the conventional technology, although the terminal device may also indicate, by using the bit in the UDC header, whether to use the compressed packet function, the packet header of the data packet always includes the UDC header. In some embodiments, if the terminal device does not use the data packet compression function for the first radio bearer, the terminal device may deactivate the data packet compression function of the first radio bearer, so that the packet header of the data packet transmitted over the first radio bearer no longer includes the compression packet header. This can reduce transmission resources. In addition, if the terminal device activates or deactivates the data packet compression function of the first radio bearer, the terminal device also notifies the network device, so that the network device determines the manner of parsing the data packet transmitted over the first radio bearer.

For example, the first device is the terminal device, the first radio bearer is the DRB, and the data packet compression function is the UDC function. For example, in some scenarios, a difference between data included in the data packet sent by the terminal device over the first DRB may be large. For example, the terminal device sends image data, and a difference between a previous frame of image and a next frame of image is large. However, the UDC function is advantageous when compression is performed on a data packet having a small difference, and a good compression gain can be obtained. In this case, the terminal device may consider that the first DRB does not need to use the UDC function. If the UDC function of the first DRB is in the inactive state, the terminal device may keep the UDC function of the first DRB in the inactive state. If the UDC function of the first DRB is in the active state, the terminal device may deactivate the UDC function of the first DRB by performing S41. It can be learned from the foregoing analysis that, in the conventional technology, although the terminal device may also indicate, by using the bit in the UDC header, whether to use the compressed packet function, the packet header of the data packet always includes the UDC header. In some embodiments, if the terminal device does not use the UDC function for the first DRB, the terminal device may deactivate the UDC function for the first DRB, so that the packet header of the data packet transmitted over the first DRB no longer includes the UDC header. This can reduce the transmission resources.

For another example, in some other scenarios, a difference between data included in the data packet sent by the terminal device over the first radio bearer may be small. For example, the terminal device sends image data, and a difference between a previous frame of image and a next frame of image is small. In this case, the terminal device may consider that the UDC function may be used for the first radio bearer. If the UDC function of the first radio bearer is in the active state, the terminal device may keep the UDC function of the first radio bearer in the active state. If the UDC function of the first radio bearer is in the inactive state, the terminal device may activate the UDC function of the first radio bearer by performing S41. In this embodiment of this application, regardless of whether the data packet compression function of the first radio bearer is activated or deactivated, it is considered that the data packet compression function of the first radio bearer is configured. In other words, even if the data packet compression function of the first radio bearer is deactivated, configuration information for the data packet compression function of the first radio bearer still exists. Therefore, if the UDC function of the first radio bearer is in the inactive state, the terminal device only needs to activate the UDC function of the first radio bearer by performing S41, and the network device does not need to reconfigure the UDC function for the first radio bearer.

According to the technical solutions provided in embodiments of this application, the first device can flexibly activate or deactivate the data packet compression function of the radio bearer, and can deactivate the data packet compression function of the radio bearer when the data packet compression function of the radio bearer does not need to be used, so that the packet header of the data packet transmitted over the radio bearer no longer includes the compression packet header, thereby reducing the transmission resources. In addition, regardless of whether the data packet compression function of the first radio bearer is in the active state or the inactive state, the data packet compression function of the first radio bearer is already configured. If the data packet compression function of the first radio bearer needs to be re-activated after being deactivated, S41 only needs to be performed, and the network device does not need to reconfigure the data packet compression function for the first radio bearer. This reduces a configuration process, reduces signaling overheads, and reduces power consumption of the device.

If the first device is the terminal device and the second device is the network device, in some embodiments, S42 may be performed before S41. The terminal device may send a first message to the network device, and the network device receives the first message from the terminal device. For S42, refer to FIG. 4A. The first message may indicate a first capability, and the first capability is a capability of dynamically activating or deactivating the data packet compression function. For example, if the data packet compression function is the UDC function, the first capability is a capability of dynamically activating or deactivating the UDC function. Further, in some embodiments, the first capability may further include a quantity of radio bearers of which the terminal device supports dynamically activating or deactivating the data packet compression function. The network device may determine, based on the first capability, whether the terminal device supports dynamically activating or deactivating the data packet compression function. In some embodiments, the network device may further determine, based on the first capability, the quantity of radio bearers of which the terminal device can support dynamically activating or deactivating the data packet compression function.

S43 may be performed after S42. The network device sends a second message to the terminal device, and the terminal device receives the second message from the network device. The second message may be used to configure the first radio bearer to use the first capability, or the second message may be used to configure the first capability for the first radio bearer, or the second message may be used to configure the first radio bearer to be capable of dynamically activating or deactivating the data packet compression function. For S43, refer to FIG. 4A. If the terminal device supports the first capability, for radio bearers corresponding to the terminal device, the network device may configure all or some of these radio bearers to use the first capability. The first radio bearer is, for example, one of the radio bearers corresponding to the terminal device. After receiving the second message, the terminal device may determine that the first radio bearer is capable of using the first capability, so that the terminal device can activate the data packet compression function of the first radio bearer, or can deactivate the data packet compression function of the first radio bearer in S41.

In some embodiments, the second message may be used to configure the data packet compression function of the first radio bearer to be in the activated state, or the second message may be used to configure the data packet compression function of the first radio bearer to be in the inactive state. In other words, in addition to configuring that the first radio bearer is capable of using the first capability, the second message may be used to configure an initial state of the data packet compression function of the first radio bearer to be the active state or the inactive state. In this way, the data packet compression function of the first radio bearer may be configured to be the active state or the inactive state without using other signaling, thereby helping reduce signaling overheads.

In some embodiments, the second message may be a message used to configure the first radio bearer. For example, if the second message is a radio resource control (RRC) message, the second message may be used to configure the data packet compression function of the first radio bearer to be in the active state or the inactive state, or may be used to configure the first radio bearer to be capable of using the first capability. This manner can implement a large quantity of functions by using a small quantity of transmission resources, improves resource utilization, and helps reduce transmission overheads.

For example, when configuring the first DRB for the terminal device, the network device may configure and activate the UDC function of the first DRB. In one embodiment, the second message is a message used to configure the first DRB, and the second message is further used to configure the initial state of the data packet compression function of the first DRB to the active state. This manner helps to be compatible with an existing solution. After the terminal device is configured with the first DRB, if the terminal device considers that the UDC function of the first DRB needs to be deactivated, the terminal device may deactivate the UDC function of the first DRB, that is, may perform S41. Certainly, after deactivating the UDC function of the first DRB, the terminal device may also activate the UDC function of the first DRB, that is, may perform S41 again.

Alternatively, when configuring the first radio bearer for the terminal device, the network device configures not to activate the data packet compression function of the first radio bearer. That is, the second message is a message used to configure the first radio bearer, and the second message is used to configure the initial state of the data packet compression function of the first radio bearer to the inactive state. If the second message is a message used to configure the first radio bearer, and the second message is not used to configure the data packet compression function of the first radio bearer to be in the active state, in this case, the second message is not used to configure the data packet compression function of the first radio bearer to be in the inactive state, and the first radio bearer may be directly considered to be in the inactive state.

For example, the second message is used to configure the first DRB for the terminal device, but the second message is not used to activate the UDC function of the first DRB. It may be considered that the UDC function of the first DRB is not activated, and therefore the UDC function is in the inactive state. In this way, if the terminal device considers that the UDC function of the first DRB does not need to be activated, the terminal device may not activate the UDC function of the first DRB. In this case, the packet header of the data packet sent by the terminal device does not include the UDC header, thereby reducing transmission resources. In this case, when the first DRB is configured, it may be considered that the UDC function of the first DRB is deactivated. If the terminal device subsequently needs to activate the UDC function of the first DRB, the terminal device may perform S41. Certainly, if the terminal device activates the UDC function of the first DRB, after activating the UDC function of the first DRB, the terminal device may further deactivate the UDC function of the first DRB, that is, may perform S41 again.

Alternatively, the second message may not be used to configure the first radio bearer, that is, the network device configures the first radio bearer by using another message. In this way, two configuration processes of configuring a radio bearer and configuring that the first radio bearer is capable of using the first capability may be distinguished by using different messages, so that the configuration process is clearer.

If the first device is the network device and the second device is the terminal device, in some embodiments, S44 may be performed before S41. The terminal device may send a first message to the network device, and the network device receives the first message from the terminal device. For S44, refer to FIG. 4B. The first message may indicate a first capability, and the first capability is a capability of dynamically activating or deactivating the data packet compression function. For example, if the data packet compression function is the UDC function, the first capability is a capability of dynamically activating or deactivating the UDC function. After receiving the first message from the terminal device, the network device may determine that a radio bearer corresponding to the terminal device is capable of using the first capability, so that the network device can activate the data packet compression function of the first radio bearer, or can deactivate the data packet compression function of the first radio bearer in S41.

In this embodiment of this application, an example in which the terminal device supports the data packet compression function is used. The terminal device reports a capability of the terminal device, so that the configuration of the terminal device by the network device better meets a capability requirement of the terminal device.

S45: The first device sends the first information, and the second device receives the first information from the first device.

The first information may indicate the first processing manner, and the second device may determine, based on the first information, to use the first processing manner on the first radio bearer. The first device processes the first radio bearer in the first processing manner, and the first device only notifies the second device of the first processing manner.

In some embodiments of sending the first information, the first information may be borne by using a control protocol data unit (PDU), that is, the first information may be sent by sending the control PDU. The control PDU is, for example, a PDCP control PDU, or may be a radio link control (RLC) control PDU.

In some embodiments of sending the first information, the first information may be borne by using a media access control control element (MAC CE), that is, the first information may be sent by sending the MAC CE.

For example, the first information is sent by using the control PDU. The control PDU may be a newly introduced control PDU, or an existing control PDU may be reused. Alternatively, the first information is sent by using the MAC CE, and the control PDU may be a newly introduced MAC CE, or an existing MAC CE may be reused. The control PDU or the MAC CE may include an indicator field. The indicator field is used to bear or carry the first information, or the indicator field is used to indicate the first information. The indicator field may be a newly added field in the control PDU or the MAC CE, or a reserved bit in the control PDU or the MAC CE may be used as the indicator field. The first processing manner is indicated by using the control PDU or the MAC CE, so that indication can be clear. Compared with the manner in which the control PDU includes the first information, the manner in which the MAC CE includes the first information further needs to indicate information about the first radio bearer, that is, the MAC CE is used to activate or deactivate which radio bearer, and the MAC CE needs to carry an identity (ID) of the radio bearer.

In some embodiments of sending the first information, the first information may also be included in a data packet. For example, the data packet including the first information is referred to as a first data packet, and the first data packet may be any data packet sent by the first device to the second device. In other words, the first information can be sent by sending the first data packet. In this way, an additional message does not need to be used to send the first information to the second device, thereby helping reduce signaling overheads.

If the first information is included in the first data packet, as a manner in which the first data packet carries the first information, the first information may occupy the one or more reserved bits in the packet header of the first data packet, or in other words, the one or more reserved bits in the packet header of the first data packet may indicate the first information. The one or more reserved bits used to indicate the first information may be located in the compression packet header included in the packet header of the first data packet, or may be located in the packet header of the first data packet but outside the compression packet header included in the packet header. For example, the data packet compression function is a UDC function. One or more reserved bits used to indicate the first information may be located in a UDC header included in the packet header of the first data packet, or may be located in the packet header of the first data packet but outside a UDC header included in the packet header.

Whether the first information is indicated by using the reserved bit in the compression packet header or the first information is indicated by using the reserved bit outside the compression packet header may be related to a length of an SN of the data packet.

For example, for the packet header of the data packet shown in FIG. 2A, the first information may be indicated by using one or two of two reserved bits (e.g., bits corresponding to two "R"s a row corresponding to Oct3) in the UDC header; or the first information may be indicated by using one or more of three reserved bits (e.g., bits corresponding to three "R"s in a row corresponding to Oct1) in the packet header, and the three reserved bits are located in the packet header of the data packet, but are located outside the UDC header included in the packet header. For example, the first information is indicated by using one reserved bit. If a value of the reserved bit is "1", it indicates that the first processing manner is activating the data packet compression function of the first radio bearer. If a value of the reserved bit is "0", it indicates that the first processing manner is deactivating the data packet compression function of the first radio bearer. If the first information is indicated by using more reserved bits, indication manners may be more abundant. The length of the SN is 12 bits or 18 bits, and the first information may be indicated by using a reserved bit in a data packet header other than a non-compressed header.

For example, for the packet header of the data packet shown in FIG. 2B, the length of the SN of the data packet is 15 bits. Therefore, in the packet header, there is a reserved bit only in the UDC header, and there is no reserved bit outside the UDC header. In this case, the first information is indicated by using only the reserved bit in the UDC header, and the first information cannot be indicated by using a reserved bit outside the UDC header. For example, the first information may be indicated by using one or two of two reserved bits (e.g., bits corresponding to two "R"s in a row corresponding to Oct3) in the UDC header in FIG. 2B.

Alternatively, whether the first information is indicated by using the reserved bit in the compression packet header or the first information is indicated by using the reserved bit outside the compression packet header may also be related to whether the data packet compression function of the first radio bearer is currently in the active state. If the data packet compression function of the first radio bearer is currently in the active state, the packet header of the first data packet sent by the first device over the first radio bearer includes the compression packet header. In this case, the first information may be indicated by using the reserved bit in the compression packet header, or the first information may be indicated by using the reserved bit located in the packet header of the first data packet but outside the compression packet header included in the packet header. If the data packet compression function of the first radio bearer is currently in the inactive state, the packet header of the first data packet sent by the first device over the first radio bearer does not include the compression packet header. In this case, the first information cannot be indicated by using the reserved bit in the compression packet header. Therefore, the first information can be indicated by using the selected reserved bit located in the packet header of the first data packet but outside the compression packet header included in the packet header.

If both the first device and the second device need to use the first processing manner on the first radio bearer, the first device and the second device need to determine, at a same time point, to use the first radio bearer on the first radio bearer, or the first device and the second device need to determine, starting from a same data packet, to use the first processing manner on the first radio bearer. For example, if the method in embodiments of this application is applied to the uplink process, the terminal device needs to use the first processing manner on the first radio bearer starting from a data packet, and the network device also needs to determine to use the first processing manner on the first radio bearer starting from the data packet. Alternatively, if the method in embodiments of this application is applied to the uplink process, the network device needs to use the first processing manner on the first radio bearer starting from a data packet, and the terminal device also needs to determine that the network device uses the first processing manner on the first radio bearer starting from the data packet. In this way, the buffer state of the terminal device can be aligned with the buffer state of the network device, so as to correctly compress and decompress a subsequent data packet.

Therefore, the first information may further include indication information, and the indication information may indicate a second data packet, or in other words, indicate a serial number of a second data packet. This case may be understood as that the first information indicates to use the first processing manner on the first radio bearer starting from the second data packet. For example, the indication information may include the serial number of the second data packet, so that the indication information is used to indicate the serial number of the second data packet.

Alternatively, the indication information may indicate the serial number of the second data packet minus 1. This case may be understood as that the first information indicates to use the first processing manner on the first radio bearer starting from a next data packet of the second data packet. For example, the indication information may include a value obtained by subtracting 1 from the serial number of the second data packet, so that the indication information can be used to indicate the serial number of the second data packet minus 1.

The first information includes the indication information. This indication manner is clear for both the first device and the second device, so that the indication is more accurate. In addition, the first information includes indication information, and the first information may be included in the control PDU, the MAC CE, or the first data packet.

In transmission over an air interface, each data packet has a number corresponding to a PDCP layer. A number of a data packet at a PDCP layer may include two parts: an SN and a hyper frame number (HFN). A combination of the two parts forms the number of the data packet, namely, a count value of the data packet. FIG. 5 is a schematic diagram of composition of a count value of a data packet. A serial number of the data packet in embodiments of this application may be the sequence number of the data packet, namely, the SN of the data packet, or the count value of the data packet, namely, the count value of the data packet. In addition, in embodiments of this application, a serial number of a data packet is the same as a serial number of a data packet obtained by compressing the data packet (e.g., a serial number of a compressed data packet). For example, the serial number of the second data packet is the same as the serial number of a compressed second data packet. If the second data packet is an uncompressed data packet, a serial number of the second data packet sent by the first device is the same as a serial number of the second data packet received by the second device. Therefore, if the indication information includes the serial number of the second data packet, the first device and the second device may determine a same data packet, namely, the second data packet. Therefore, both the first device and the second device can determine to activate the data packet compression function of the first radio bearer or deactivate the data packet compression function of the first radio bearer starting from the second data packet. Alternatively, if the indication information includes the serial number of the second data packet minus 1, the first device and the second device may determine a same data packet, namely, the second data packet. Therefore, both the first device and the second device can determine to activate the data packet compression function of the first radio bearer or deactivate the data packet compression function of the first radio bearer starting from the next data packet of the second data packet.

Alternatively, the first information may not include the indication information. For example, the first information may indicate to use the first processing manner on the first radio bearer starting from the $1^{st}$ data packet sent after the first information. In this case, the first information may be included in the control PDU, the MAC CE, or the first data packet. Therefore, the second device receiving the first information may determine to use the first processing manner on the first radio bearer starting from the $1^{st}$ data packet received after the first information. For example, if the first information is borne in the control PDU or the MAC CE, the first information may indicate to use the first processing manner on the first radio bearer starting from the $1^{st}$ data packet sent after the control PDU or the MAC CE. For another example, if the first information is borne in the first data packet, the first information may indicate to use the first processing manner on the first radio bearer starting from the $1^{st}$ data packet sent after the first data packet (it should be noted that the first data packet and the $1^{st}$ data packet are different concepts, and the $1^{st}$ data packet is the $1^{st}$ data packet transmitted after a moment). In this manner, the first information does not need to include excessive information, thereby helping reduce signaling overheads.

For example, the first information may occupy one bit. If a value of the bit is "0", it indicates that the data packet compression function of the first radio bearer is deactivated starting from the $1^{st}$ data packet sent after the first information, or in other words, it indicates that the first processing manner is deactivating the data packet compression function of the first radio bearer; or if a value of the bit is "1", it indicates that the data packet compression function of the first radio bearer is activated starting from the $1^{st}$ data packet sent after the first information, or in other words, it indicates that the first processing manner is activating the data packet compression function of the first radio bearer. Alternatively, the first information may occupy more bits.

Alternatively, the first information may not include the indication information. For example, if the first information is included in the first data packet, the first information may indicate to use the first processing manner on the first radio bearer starting from the $1^{st}$ data packet sent after the first information (or starting from a next data packet of the first data packet); or the first information may indicate to use the first processing manner on the first radio bearer starting from the first data packet. In this manner, the first data packet in which the first information is located may also complete some indication functions, and the first information does not need to include excessive information, thereby helping reduce signaling overheads.

In some embodiments, after activating or deactivating the data packet compression function of the first radio bearer, or after using the first processing manner on the first radio bearer, the first device may further perform S46, that is, the first device resets a predefined dictionary corresponding to the first radio bearer. In addition, after activating or deactivating the data packet compression function of the first radio bearer, or after using the first processing manner on the first radio bearer, the second device may further perform S47, that is, the second device resets a predefined dictionary corresponding to the first radio bearer. S46 may be performed before S47, or S47 may be performed after S47, or S46 and S47 may be performed simultaneously. In FIG. 4A and FIG. 4B, an example in which S46 is performed before S47 is used. In addition, because S42, S43, S46, and S47 may or may not be performed, these operations are represented by dashed lines in FIG. 4A. In addition, because S44, S46, and S47 may or may not be performed, these operations are also represented by dashed lines in FIG. 4B. The predefined dictionary may be used to compress a data packet. For example, when the data packet compression function is used to compress the data packet transmitted by using the first radio bearer, the predefined dictionary is used. For example, if the data packet compression function is the UDC function, for descriptions about the predefined dictionary, refer to the foregoing description. For example, one predefined dictionary is "abc" shown in FIG. 1.

For example, resetting the predefined dictionary after the data packet compression function of the first radio bearer is activated is equivalent to resetting the predefined dictionary when the data packet compression function starts to be used, so that a buffer state of the first device is consistent with a buffer state of the second device, thereby improving a success rate of data packet compression and decompression. For another example, if the predefined dictionary is reset after the data packet compression function of the first radio bearer is deactivated, the predefined dictionary does not need to be reset again after the data packet compression function of the first radio bearer is re-activated, so that the data packet can be transmitted as soon as possible after the data packet compression function of the first radio bearer is activated.

If the data packet compression function of the first radio bearer is separately processed twice, for example, a first processing is activating the data packet compression function of the first radio bearer, and the second processing is deactivating the data packet compression function of the first radio bearer; or the first processing is deactivating the data packet compression function of the first radio bearer, and the second processing is activating the data packet compression function of the first radio bearer, the predefined dictionary only needs to be reset after one of the processing processes ends, without resetting the predefined dictionary after the two processing processes end. For example, refer to three communication methods shown in FIG. 6 to FIG. 8, which are all detailed examples of the embodiment shown in FIG. 4A. In procedures shown in FIG. 6 to FIG. 8, an example in which a first radio bearer is a first DRB, a data packet compression function is a UDC function, and a communication process is an uplink process is used.

Figure 6:
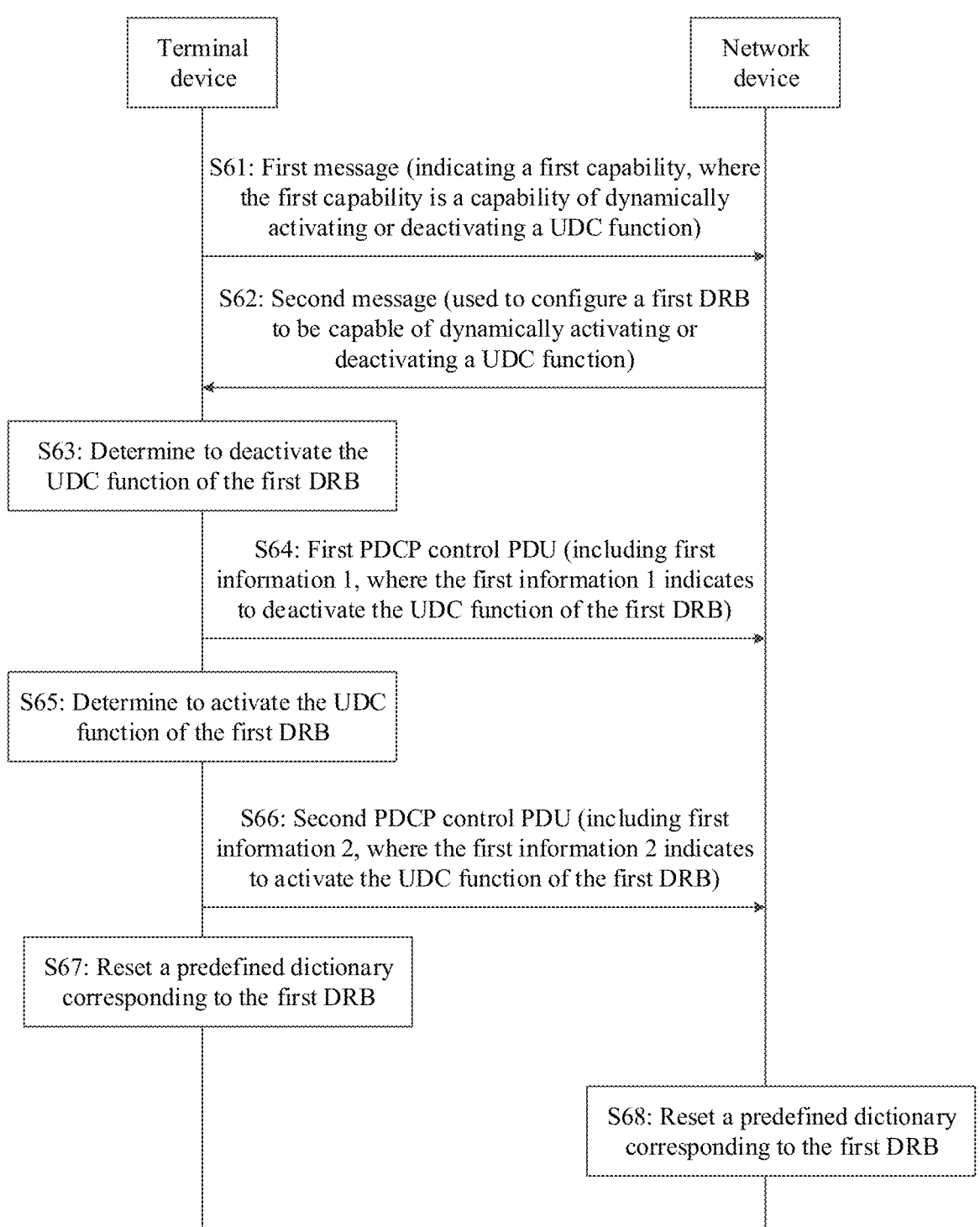
FIG. 6 is a flowchart of an example of a communication method according to some embodiments.

A communication method shown in FIG. 6 is a first example of the embodiment shown in FIG. 4A.

S61: A terminal device sends a first message to a network device, and the network device receives the first message from the terminal device.

For example, the first message indicates a first capability, and the first capability is a capability of dynamically activating or deactivating UDC.

S62: The network device sends a second message to the terminal device, and the terminal device receives the second message from the network device.

The second message is used to configure the first DRB for the terminal device. In addition, the second message is further used to configure the first DRB of the terminal device to be capable of activating or deactivating the UDC function, and the second message is further used to configure to activate the UDC function of the first DRB.

In a procedure shown in FIG. 6, an example in which the UDC function of the first DRB is activated when the first DRB is configured is used.

S63: The terminal device determines to deactivate the UDC function of the first DRB.

For example, the terminal device needs to send a plurality of pictures to the network device over the first DRB, where the plurality of pictures are pictures that are obtained through photographing and that have a large difference, and a compression gain may not be obtained through the UDC compression. Therefore, the terminal device can determine to deactivate the UDC function of the first DRB.

S64: The terminal device sends a first PDCP control PDU to the network device, and the network device receives the first PDCP control PDU from the terminal device. The first PDCP control PDU includes first information, and the first information indicates to deactivate the UDC function of the first DRB. To be distinguished from first information that may appear below, the first information may be referred to as first information 1.

In S64, an example in which the first information 1 is borne in the PDCP control PDU is used. In addition, the first information 1 may further include indication information. To be distinguished from indication information that may appear below, the indication information may be referred to as indication information 1. The indication information 1 indicates a count value of a second data packet 1. It indicates that the first information 1 indicates to deactivate the UDC function of the first DRB starting from the second data packet 1. The second data packet 1 may be a next data packet to be sent by the terminal device, or may be any data packet to be sent by the terminal device. In this case, when sending the second data packet 1 to the network device, the terminal device no longer performs compression by using the UDC function. After receiving the first information 1, the network device may also determine to deactivate the UDC function of the first DRB starting from the second data packet 1. In this case, when receiving the second data packet 1 from the terminal device, the network device may also determine that the second data packet 1 is a data packet not compressed by using the UDC function. Therefore, when processing the second data packet 1, the network device processes the second data packet 1 in a manner in which a packet header of the second data packet 1 does not have a UDC header, so that the network device can obtain a correct second data packet 1.

S65: The terminal device determines to activate the UDC function of the first DRB.

For example, the terminal device starts to play a game, and scenarios of the game are continuous. This is equivalent to that the terminal device needs to send a plurality of pictures to the network device over the first DRB, and there is a small difference between the plurality of pictures. In this case, the image can be compressed by using the UDC function to obtain a better compression gain. Therefore, the terminal device can determine to re-activate the UDC function of the first DRB.

In this embodiment of this application, configuration of the UDC function of the first DRB is not changed when the UDC function of the first DRB is deactivated. That is, the first DRB still has the UDC function after the UDC function of the first DRB is deactivated. Therefore, if the UDC function of the first DRB needs to be re-activated, the terminal device can directly activate the UDC function of the first DRB, and the network device does not need to send, to the terminal device, configuration information used to configure the UDC function of the first DRB. That is, the network device does not need to reconfigure the UDC function for the first DRB.

S66: The terminal device sends a second PDCP control PDU to the network device, and the network device receives the second PDCP control PDU from the terminal device. The second PDCP control PDU includes first information, and the first information indicates to activate the UDC function of the first DRB. The first information may be referred to as first information 2.

In S66, an example in which the first information 2 is borne in the PDCP control PDU is used. Actually, if the terminal device needs to send first information for a plurality of times, different first information may be borne in messages of a same type, or may be borne in messages of different types. For example, the first information 2 in S66 may also be borne in an RLC control PDU, or borne in a data packet. In addition, the first information 2 may further include indication information. The indication information may be referred to as indication information 2, and the indication information 2 indicates a count value of a second data packet 2. It indicates that the first information indicates to activate the UDC function of the first DRB starting from the second data packet 2. The second data packet 2 may be a next data packet to be sent by the terminal device, or may be any data packet to be sent by the terminal device. In this case, when sending the second data packet 2 to the network device, the terminal device performs compression by using the UDC function. After receiving the first information, the network device may also determine to activate the UDC function of the first DRB starting from the second data packet 2. In this case, when receiving the second data packet 2 from the terminal device, the network device may also determine that the second data packet 2 is a data packet compressed by using the UDC function. Therefore, when processing the second data packet 2, the network device processes the second data packet 2 in a manner in which a packet header of the second data packet 2 has a UDC header, so that the network device can obtain a correct second data packet 2.

S67: The terminal device resets a predefined dictionary corresponding to the first DRB.

S68: The network device resets a predefined dictionary corresponding to the first DRB.

After activating the data packet compression function of the first DRB, in other words, after using a first processing manner for the first DRB, the terminal device may reset the predefined dictionary corresponding to the first DRB. In addition, after activating the data packet compression function of the first DRB, in other words, after using the first processing manner for the first DRB, the network device may reset the predefined dictionary corresponding to the first DRB. S67 may be performed before S68, or S67 may be performed after S68, or S67 and S68 may be performed simultaneously. In FIG. 6, an example in which S67 is performed before S68 is used.

It can be learned that the terminal device and the network device first deactivate the UDC function of the first DRB, and then activate the UDC function of the first DRB. This is equivalent to performing two processing processes on the first DRB. The terminal device and the network device only need to reset the predefined dictionary corresponding to the first DRB after one of the processing processes ends (the procedure shown in FIG. 6 is used as an example after the activation process ends), without resetting the predefined dictionary after each processing process ends. This can ensure that a buffer state of the terminal device is consistent with a buffer state of the network device, and can reduce workload of the terminal device and the network device.

Figure 7:
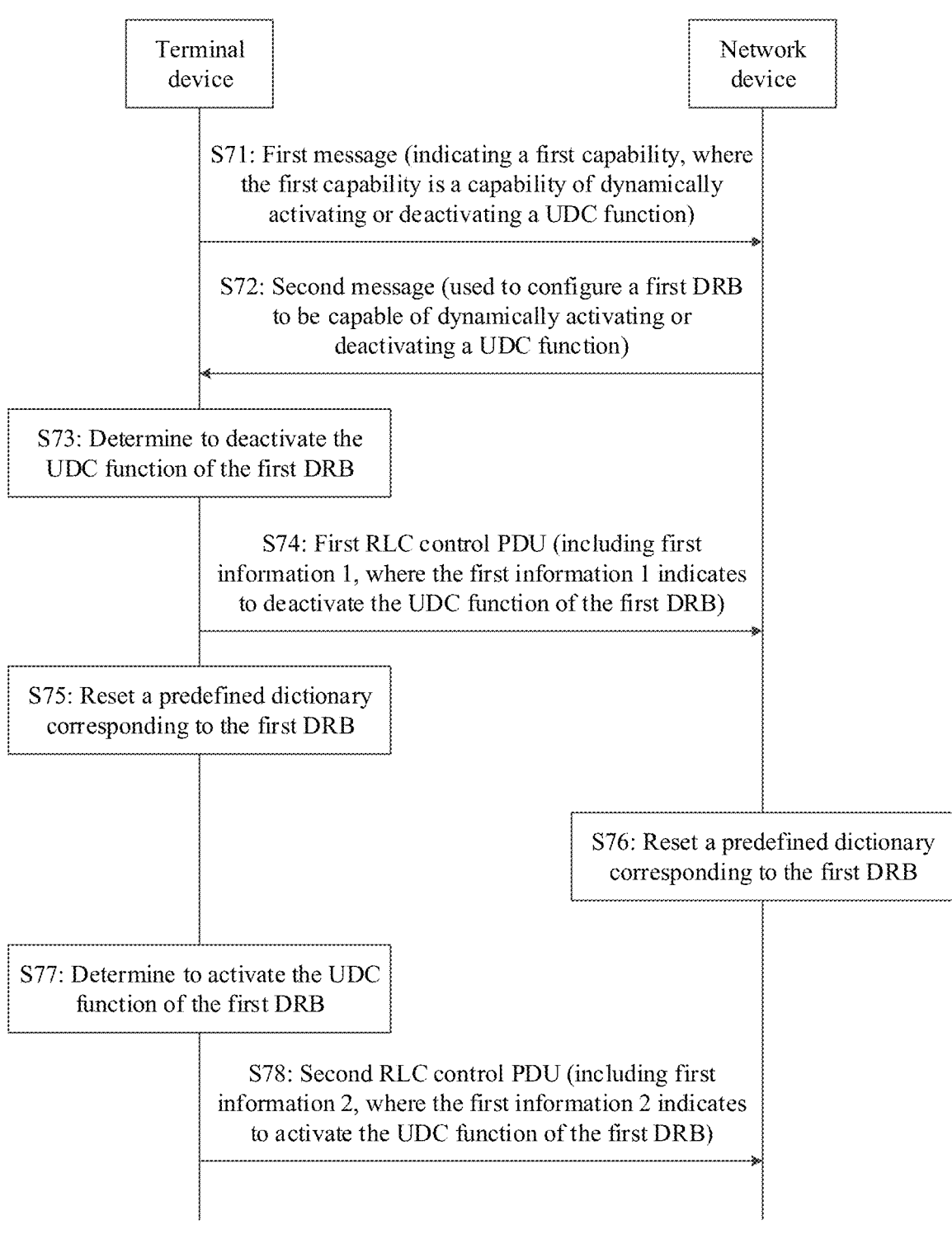
FIG. 7 is a flowchart of another example of a communication method according to some embodiments.

A procedure shown in FIG. 7 is a second example of the embodiment shown in FIG. 4A.

S71: A terminal device sends a first message to a network device, and the network device receives the first message from the terminal device.

For example, the first message indicates a first capability, and the first capability is a capability of dynamically activating or deactivating UDC.

S72: The network device sends a second message to the terminal device, and the terminal device receives the second message from the network device.

The second message is used to configure a first DRB for the terminal device. In addition, the second message is further used to configure the first DRB of the terminal device to be capable of activating or deactivating the UDC function, and the second message is further used to configure to activate the UDC function of the first DRB.

In the procedure shown in FIG. 7, the UDC function of the first DRB is activated when the first DRB is configured.

S73: The terminal device determines to deactivate the UDC function of the first DRB.

S74: The terminal device sends a first RLC control PDU to the network device, and the network device receives the first RLC control PDU from the terminal device. The first RLC control PDU includes first information, and the first information indicates to deactivate the UDC function of the first DRB. To be distinguished from first information that may appear below, the first information may be referred to as first information 1.

In S74, an example in which the first information 1 is borne in the RLC control PDU is used. In addition, the first information 1 may further include indication information. To be distinguished from indication information that may appear below, the indication information may be referred to as indication information 1. The indication information 1 indicates an SN of a second data packet 1. It indicates that the first information 1 indicates to deactivate the UDC function of the first DRB starting from the second data packet 1. The second data packet 1 may be a next data packet to be sent by the terminal device, or may be any data packet to be sent by the terminal device.

S75: The terminal device resets a predefined dictionary corresponding to the first DRB.

S76: The network device resets a predefined dictionary corresponding to the first DRB.

After deactivating the data packet compression function of the first DRB, in other words, after using a first processing manner for the first DRB, the terminal device may reset the predefined dictionary corresponding to the first DRB. In addition, after deactivating the data packet compression function of the first DRB, in other words, after using the first processing manner for the first DRB, the network device may reset the predefined dictionary corresponding to the first DRB. S75 may be performed before S76, or S75 may be performed after S76, or S75 and S76 may be performed simultaneously. In FIG. 7, an example in which S75 is performed before S76 is used.

S77: The terminal device determines to activate the UDC function of the first DRB.

S78: The terminal device sends a second RLC control PDU to the network device, and the network device receives the second RLC control PDU from the terminal device. The second RLC control PDU includes first information, and the first information indicates to activate the UDC function of the first DRB. The first information may be referred to as first information 2. In this embodiment of this application, configuration of the UDC function of the first DRB is not changed when the UDC function of the first DRB is deactivated. That is, the first DRB still has the UDC function after the UDC function of the first DRB is deactivated. Therefore, if the UDC function of the first DRB needs to be re-activated, the terminal device can directly activate the UDC function of the first DRB, and the network device does not need to send, to the terminal device, configuration information used to configure the UDC function of the first DRB. That is, the network device does not need to reconfigure the UDC function for the first DRB.

In S78, an example in which the first information 2 is borne in the RLC control PDU is used. Actually, if the terminal device needs to send first information for a plurality of times, different first information may be borne in messages of a same type, or may be borne in messages of different types. For example, the first information 2 in S78 may also be borne in a PDCP control PDU, or borne in a data packet. In addition, the first information 2 may further include indication information. The indication information may be referred to as indication information 2, and the indication information 2 indicates a count value of a second data packet 2. It indicates that the first information indicates to activate the UDC function of the first DRB starting from the second data packet 2. The second data packet 2 may be a next data packet to be sent by the terminal device, or may be any data packet to be sent by the terminal device.

It can be learned that the terminal device and the network device first deactivate the UDC function of the first DRB, and then activate the UDC function of the first DRB. This is equivalent to performing two processing processes on the first DRB. The terminal device and the network device only need to reset the predefined dictionary corresponding to the first DRB after one of the processing processes ends (the procedure shown in FIG. 7 is used as an example after the deactivation process ends), without resetting the predefined dictionary after each processing process ends. This can ensure that a buffer state of the terminal device is consistent with a buffer state of the network device, and can reduce workload of the terminal device and the network device.

Figure 8:
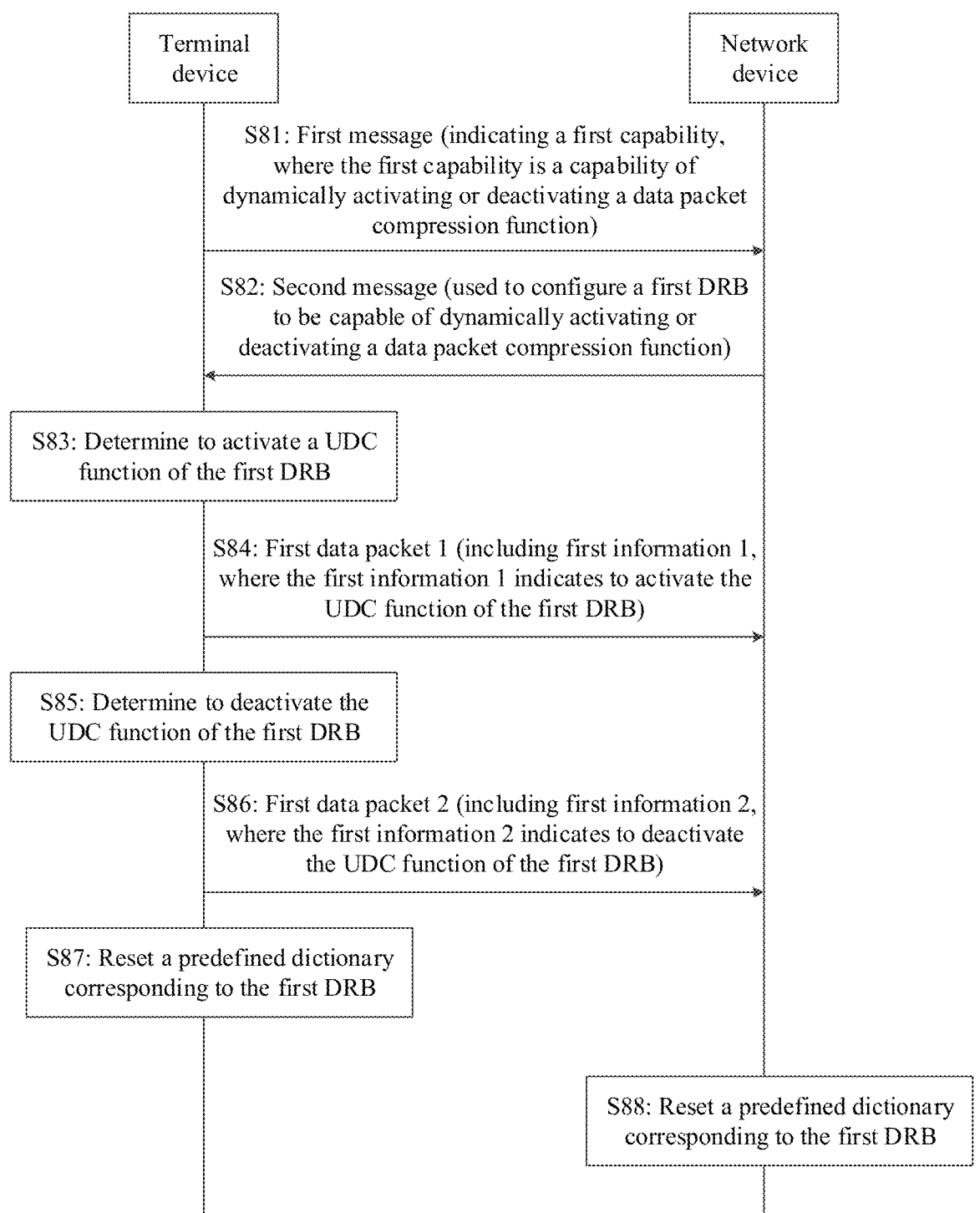
FIG. 8 is a flowchart of still another example of a communication method according to some embodiments.

A procedure shown in FIG. 8 is a third example of the embodiment shown in FIG. 4A.

S81: A terminal device may send a first message to a network device, and the network device receives the first message from the terminal device.

For example, the first message indicates a first capability, and the first capability is a capability of dynamically activating or deactivating UDC.

S82: The network device sends a second message to the terminal device, and the terminal device receives the second message from the network device.

The second message is used to configure a first DRB for the terminal device. In addition, the second message is further used to configure the first DRB of the terminal device to be capable of activating or deactivating the UDC function, and the second message is not used to configure to activate the UDC function of the first DRB.

In the procedure shown in FIG. 8, for example, the configuration information is not used to configure to activate the UDC function of the first DRB. This is equivalent to that in the procedure shown in FIG. 8, the UDC function of the first DRB is not activated when the first DRB is configured. It can be learned that although the UDC function of the first DRB is not activated, the UDC function of the first DRB is still configured, that is, the first DRB still has the UDC function.

S83: The terminal device determines to activate the UDC function of the first DRB.

S84: The terminal device sends a first data packet 1 to the network device, and the network device receives the first data packet 1 from the terminal device. The first data packet 1 includes first information, and the first information indicates to activate the UDC function of the first DRB. To be distinguished from first information that may appear below, the first information may be referred to as first information 1.

In S84, an example in which the first information 1 is borne in the data packet is used. In addition, the first information 1 may further include indication information. To be distinguished from indication information that may appear below, the indication information may be referred to as indication information 1. The indication information 1 indicates a count value of a second data packet 1 minus 1. It indicates that the first information 1 indicates to deactivate the UDC function of the first DRB starting from a next data packet of the second data packet 1. The second data packet 1 may be a next data packet to be sent by the terminal device, or may be any data packet to be sent by the terminal device.

S85: The terminal device determines to deactivate the UDC function of the first DRB.

S86: The terminal device sends the first data packet 2 to the network device, and the network device receives the first data packet 2 from the terminal device. The first data packet 2 includes first information, and the first information indicates to activate the UDC function of the first DRB. The first information may be referred to as first information 2.

In S86, an example in which the first information 2 is borne in the data packet is used. Actually, if the terminal device needs to send first information for a plurality of times, different first information may be borne in messages of a same type, or may be borne in messages of different types. For example, the first information 2 in S86 may also be borne in a PDCP control PDU, borne in an RLC control PDU, or borne in a MAC CE. In addition, the first information 2 may further include indication information. The indication information may be referred to as indication information 2, and the indication information 2 indicates an SN of a second data packet 2. It indicates that the first information indicates to deactivate the UDC function of the first DRB starting from the second data packet 2. The second data packet 2 may be a next data packet to be sent by the terminal device, or may be any data packet to be sent by the terminal device.

S87: The terminal device resets a predefined dictionary corresponding to the first DRB.

S88: The network device resets a predefined dictionary corresponding to the first DRB.

After activating the data packet compression function of the first DRB, in other words, after using a first processing manner for the first DRB, the terminal device may reset the predefined dictionary corresponding to the first DRB. In addition, after activating the data packet compression function of the first DRB, in other words, after using the first processing manner for the first DRB, the network device may reset the predefined dictionary corresponding to the first DRB. S87 may be performed before S88, or S87 may be performed after S88, or S87 and S88 may be performed simultaneously. In FIG. 8, an example in which S87 is performed before S88 is used.

It can be learned that the terminal device and the network device first activate the UDC function of the first DRB, and then deactivate the UDC function of the first DRB. This is equivalent to performing two processing processes on the first DRB. The terminal device and the network device only need to reset the predefined dictionary corresponding to the first DRB after one of the processing processes ends (the procedure shown in FIG. 8 is used as an example after the deactivation process ends, and the predefined dictionary can actually be reset after the activation process ends), without resetting the predefined dictionary after each processing process ends. This can ensure that a buffer state of the terminal device is consistent with a buffer state of the network device, and can reduce workload of the terminal device and the network device.

In embodiments of this application, the first device can activate or deactivate the data packet compression function of the radio bearer. If the data packet compression function of the radio bearer is deactivated, the packet header of the data packet transmitted over the radio bearer no longer includes the compression packet header. This can reduce the transmission resources. In other words, if the first device considers that the data packet compression function does not need to be used for the first radio bearer, the first device does not need to disable the data packet compression function of the first radio bearer, and only needs to deactivate the data packet compression function of the first radio bearer. Even if the data packet compression function of the radio bearer is deactivated, the radio bearer still has the data packet compression function, that is, configuration of the data packet compression function is not removed with a deactivation operation. Therefore, if the data packet compression function of the radio bearer needs to be re-activated after the data packet compression function of the radio bearer is deactivated, the data packet compression function of the radio bearer only needs to be activated, and the network device does not need to reconfigure the packet compression function for the radio bearer. This reduces the configuration process of the network device, and also reduces the signaling overheads. In addition, to activate or deactivate the data packet compression function of the radio bearer, an intra-cell handover procedure does not need to be performed. This simplifies a process of deactivating the data packet compression function, reduces required time, and improves efficiency. The intra-cell handover procedure does not need to be performed, and this reduces signaling interaction, and also reduces the transmission overheads. In addition, because the operation of activating or deactivating the data packet compression function can be performed on the radio bearer in a targeted manner without performing the intra-cell handover procedure, another radio bearer is not affected when only one radio bearer needs to be operated. This reduces burden over the network device and the terminal device, and can ensure normal communication of another radio bearer as much as possible.

In addition, in embodiments of this application, the data packet compression function can be activated when required, rather than activated when the radio bearer is configured. When the data packet compression function is configured for the radio bearer, if the data packet compression function is not activated, the packet header of the data packet transmitted over the radio bearer does not include information (for example, a UDC header) corresponding to the data packet compression function, thereby reducing the transmission resources. Deactivating the data packet compression function can also reduce power consumption of the terminal device. In addition, if the data packet compression function of the radio bearer is deactivated for the receive end, the receive end does not need to parse the UDC header when parsing the data packet transmitted over the radio bearer, thereby reducing receiving complexity.

With reference to the accompanying drawings, the following describes apparatuses configured to implement the foregoing methods in embodiments of this application. Therefore, all the foregoing content may be used in the following embodiments. Repeated content is not described again.

Figure 9:
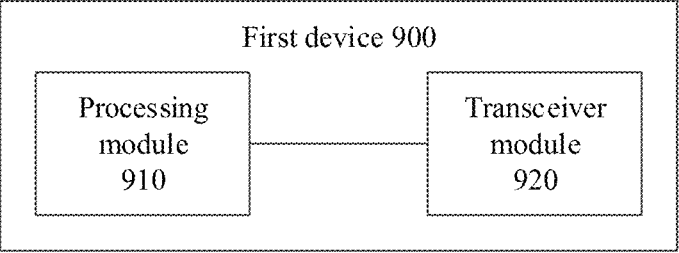
FIG. 9 is a schematic block diagram of a first device according to some embodiments.

FIG. 9 is a schematic block diagram of a communication apparatus 900 according to an embodiment of this application. For example, the communication apparatus 900 is a first device 900.

The first device 900 includes a processing module 910 and a transceiver module 920. For example, the first device 900 may be a terminal device, or may be a chip used in the terminal device, or another combined device or a component that has functions of the terminal device. When the first device 900 is the terminal device, the transceiver module 920 may be a transceiver, where the transceiver may include an antenna, a radio frequency circuit, and the like; and the processing module 910 may be a processor, for example, a baseband processor, where the baseband processor may include one or more central processing units (CPUs). When the first device 900 is the component that has the functions of the terminal device, the transceiver module 920 may be a radio frequency unit, and the processing module 910 may be a processor, for example, a baseband processor. When the first device 900 is a chip system, the transceiver module 920 may be an input/output interface of a chip (for example, a baseband chip), and the processing module 910 may be a processor of the chip system, and may include one or more central processing units. It should be understood that the processing module 910 in this embodiment of this application may be implemented by a processor or a processor-related circuit component, and the transceiver module 920 may be implemented by a transceiver or a transceiver-related circuit component.

Alternatively, for example, the first device 900 may be a network device, or may be a chip used in the network device or another combined device or a component that has the functions of the network device. When the first device 900 is the network device, the transceiver module 920 may be a transceiver, where the transceiver may include an antenna, a radio frequency circuit, and the like; and the processing module 910 may be a processor, for example, a baseband processor, where the baseband processor may include one or more CPUs. When the first device 900 is the component that has the functions of the network device, the transceiver module 920 may be a radio frequency unit, and the processing module 910 may be a processor, for example, a baseband processor. When the first device 900 is a chip system, the transceiver module 920 may be an input/output interface of a chip (for example, a baseband chip), and the processing module 910 may be a processor of the chip system, and may include one or more central processing units. It should be understood that the processing module 910 in this embodiment of this application may be implemented by a processor or a processor-related circuit component, and the transceiver module 920 may be implemented by a transceiver or a transceiver-related circuit component.

For example, the processing module 910 may be configured to perform all operations, such as S41 and S46, that are performed by the terminal device in the embodiment shown in FIG. 4A except sending and receiving operations, and/or configured to support another process of the technology described in this specification. The transceiver module 920 may be configured to perform all the sending and receiving operations, such as S42, S43 and S45, that are performed by the terminal device in the embodiment shown in FIG. 4A, and/or configured to support another process of the technology described in this specification.

For another example, the processing module 910 may be configured to perform all operations, such as S46, that are performed by the terminal device in the embodiment shown in FIG. 4B except sending and receiving operations, and/or configured to support another process of the technology described in this specification. The transceiver module 920 may be configured to perform all the sending and receiving operations, such as S44 and S45, that are performed by the terminal device in the embodiment shown in FIG. 4B, and/or configured to support another process of the technology described in this specification.

For another example, the processing module 910 may be configured to perform all operations, such as S63, S65, and S67, that are performed by the terminal device in the embodiment shown in FIG. 6 except sending and receiving operations, and/or configured to support another process of the technology described in this specification. The transceiver module 920 may be configured to perform all the sending and receiving operations, such as S61, S62, S64 and S66, that are performed by the terminal device in the embodiment shown in FIG. 6, and/or configured to support another process of the technology described in this specification.

For another example, the processing module 910 may be configured to perform all operations, such as S73, S75, and S77, that are performed by the terminal device in the embodiment shown in FIG. 7 except sending and receiving operations, and/or configured to support another process of the technology described in this specification. The transceiver module 920 may be configured to perform all the sending and receiving operations, such as S71, S72, S74 and S78, that are performed by the terminal device in the embodiment shown in FIG. 7, and/or configured to support another process of the technology described in this specification.

For still another example, the processing module 910 may be configured to perform all operations, such as S83, S85, and S87, that are performed by the terminal device in the embodiment shown in FIG. 8 except sending and receiving operations, and/or configured to support another process of the technology described in this specification. The transceiver module 920 may be configured to perform all the sending and receiving operations, such as S81, S82, S84 and S86, that are performed by the terminal device in the embodiment shown in FIG. 8, and/or configured to support another process of the technology described in this specification.

In addition, the transceiver module 920 may be a functional module, and the functional module can complete both a sending operation and a receiving operation. For example, the transceiver module 920 may be configured to perform all sending operations and receiving operations performed by the terminal device in any one of the embodiment shown in FIG. 4A, the embodiment shown in FIG. 4B, the embodiment shown in FIG. 6, the embodiment shown in FIG. 7, and the embodiment shown in FIG. 8. For example, when performing the sending operation, the transceiver module 920 may be considered as a sending module; and when performing the receiving operation, the transceiver module 920 may be considered as a receiving module. Alternatively, the transceiver module 920 may be two functional modules, the transceiver module 920 may be considered as a general term of the two functional modules, and the two functional modules are respectively a sending module and a receiving module. The sending module is configured to complete a sending operation. For example, the sending module may be configured to perform all sending operations performed by the terminal device in the embodiment shown in FIG. 4A, the embodiment shown in FIG. 4B, the embodiment shown in FIG. 6, the embodiment shown in FIG. 7, or the embodiment shown in FIG. 8. The receiving module is configured to complete a receiving operation. For example, the receiving module may be configured to perform all receiving operations performed by the terminal device in any one of the embodiment shown in FIG. 4A, the embodiment shown in FIG. 4B, the embodiment shown in FIG. 6, the embodiment shown in FIG. 7, or the embodiment shown in FIG. 8.

The processing module 910 is configured to determine to process a first radio bearer in a first processing manner, where the first processing manner is activating or deactivating a data packet compression function of the first radio bearer.

The transceiver module 920 is configured to send first information, where the first information is used to indicate the first processing manner.

In some embodiments, deactivating a data packet compression function of the first radio bearer indicates changing the data packet compression function of the first radio bearer from an active state to an inactive state; and/or activating a data packet compression function of the first radio bearer indicates changing the data packet compression function of the first radio bearer from an inactive state to an active state, where in the active state, a data packet over the first radio bearer includes a compression packet header, and in the inactive state, a data packet over the first radio bearer does not include a compression packet header.

In some embodiments, the first information is included in a control PDU, a MAC CE, or a first data packet.

In some embodiments, the control PDU is a PDCP control PDU or an RLC control PDU.

In some embodiments, the first information is included in the first data packet, and the first information is indicated by using one or more reserved bits in a packet header of the first data packet.

In some embodiments, the one or more reserved bits are located in a compression packet header included in the packet header of the first data packet; or the one or more reserved bits are located in the packet header of the first data packet, but are not located in a compression packet header included in the packet header of the first data packet.

In some embodiments, the first information is used to indicate to use the first processing manner on the first radio bearer starting from the $1^{st}$ data packet sent after the first information; the first information is included in the first data packet, and the first information is used to indicate to use the first processing manner on the first radio bearer starting from the first data packet; the first information further includes indication information, the indication information is used to indicate a serial number of a second data packet, and the first information is used to indicate to use the first processing manner on the first radio bearer starting from the second data packet; or the first information further includes indication information, the indication information is used to indicate a serial number of a second data packet minus 1, and the first information is used to indicate to use the first processing manner on the first radio bearer starting from a next data packet of the second data packet.

In some embodiments, the processing module 910 is further configured to: after the data packet compression function of the first radio bearer is activated or deactivated, reset a predefined dictionary corresponding to the first radio bearer, where the predefined dictionary is used to compress, by using the data packet compression function, a data packet transmitted over the first radio bearer.

In some embodiments, if the first device 900 is a terminal device, and a second device (e.g., a device that receives the first information) is a network device, the transceiver module 920 is further configured to: send a first message, where the first message is used to indicate a first capability, and the first capability is a capability of dynamically activating or deactivating a data packet compression function; and receive a second message, where the second message is used to configure the first radio bearer to be capable of activating or deactivating the data packet compression function.

In some embodiments, the second message is further used to configure the data compression function of the first radio bearer to be in the active state, or after the second message is received, the data compression function of the first radio bearer is in the inactive state, where the second message is not used to configure the data compression function of the first radio bearer to be in the active state.

In some embodiments, if the first device 900 is a network device, and a second device (e.g., a device that receives the first information) is a terminal device, the transceiver module 920 is further configured to receive a first message, where the first message is used to indicate a first capability, and the first capability is a capability of dynamically activating or deactivating a data packet compression function.

For another function that is implemented by the first device 900, refer to related descriptions of the embodiment shown in FIG. 4A, the embodiment shown in FIG. 4B, the embodiment shown in FIG. 6, the embodiment shown in FIG. 7, or the embodiment shown in FIG. 8. Details are not described again.

Figure 10:
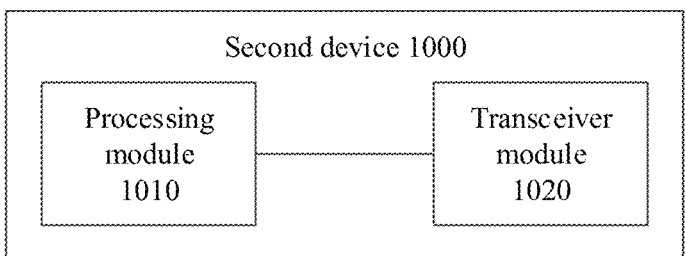
FIG. 10 is a schematic block diagram of a second device according to some embodiments.

FIG. 10 is a schematic block diagram of a communication apparatus 1000 according to an embodiment of this application. For example, the communication apparatus 1000 is a second device 1000.

The second device 1000 includes a processing module 1010 and a transceiver module 1020. For example, the second device 1000 may be a network device, or may be a chip used in the network device, or another combined device or a component that has functions of the network device. When the second device 1000 is the network device, the transceiver module 1020 may be a transceiver, where the transceiver may include an antenna, a radio frequency circuit, and the like; and the processing module 1010 may be a processor, for example, a baseband processor, where the baseband processor may include one or more CPUs. When the second device 1000 is the component having the functions of the network device, the transceiver module 1020 may be a radio frequency unit, and the processing module 1010 may be a processor, for example, a baseband processor. When the second device 1000 is a chip system, the transceiver module 1020 may be an input/output interface of a chip (for example, a baseband chip), and the processing module 1010 may be a processor of the chip system, and may include one or more central processing units. It should be understood that the processing module 1010 in this embodiment of this application may be implemented by a processor or a processor-related circuit component, and the transceiver module 1020 may be implemented by a transceiver or a transceiver-related circuit component.

Alternatively, for example, the second device 1000 may be a terminal device, or may be a chip used in the terminal device, or another combined device or a component that has functions of the terminal device. When the second device 1000 is the terminal device, the transceiver module 1020 may be a transceiver, where the transceiver may include an antenna, a radio frequency circuit, and the like; and the processing module 1010 may be a processor, for example, a baseband processor, where the baseband processor may include one or more CPUs. When the second device 1000 is the component having the functions of the terminal device, the transceiver module 1020 may be a radio frequency unit, and the processing module 1010 may be a processor, for example, a baseband processor. When the second device 1000 is a chip system, the transceiver module 1020 may be an input/output interface of a chip (for example, a baseband chip), and the processing module 1010 may be a processor of the chip system, and may include one or more central processing units. It should be understood that the processing module 1010 in this embodiment of this application may be implemented by a processor or a processor-related circuit component, and the transceiver module 1020 may be implemented by a transceiver or a transceiver-related circuit component.

For example, the processing module 1010 may be configured to perform all operations, such as S47, that are performed by the network device in the embodiment shown in FIG. 4A except sending and receiving operations, and/or configured to support another process of the technology described in this specification. The transceiver module 1020 may be configured to perform all the sending and receiving operations, such as S42, S43 and S45, that are performed by the network device in the embodiment shown in FIG. 4A, and/or configured to support another process of the technology described in this specification.

For another example, the processing module 1010 may be configured to perform all operations, such as S41 and S47, that are performed by the network device in the embodiment shown in FIG. 4B except sending and receiving operations, and/or configured to support another process of the technology described in this specification. The transceiver module 1020 may be configured to perform all the sending and receiving operations, such as S44 and S45, that are performed by the network device in the embodiment shown in FIG. 4B, and/or configured to support another process of the technology described in this specification.

For another example, the processing module 1010 may be configured to perform all operations, such as S68, that are performed by the network device in the embodiment shown in FIG. 6 except sending and receiving operations, and/or configured to support another process of the technology described in this specification. The transceiver module 1020 may be configured to perform all the sending and receiving operations, such as S61, S62, S64, and S66, that are performed by the network device in the embodiment shown in FIG. 6, and/or configured to support another process of the technology described in this specification.

For another example, the processing module 1010 may be configured to perform all operations, such as S76, that are performed by the network device in the embodiment shown in FIG. 7 except sending and receiving operations, and/or configured to support another process of the technology described in this specification. The transceiver module 1020 may be configured to perform all the sending and receiving operations, such as S71, S72, S74, and S78, that are performed by the network device in the embodiment shown in FIG. 7, and/or configured to support another process of the technology described in this specification.

For still another example, the processing module 1010 may be configured to perform all operations, such as S88, that are performed by the network device in the embodiment shown in FIG. 8 except sending and receiving operations, and/or configured to support another process of the technology described in this specification. The transceiver module 1020 may be configured to perform all the sending and receiving operations, such as S81, S82, S84, and S86, that are performed by the network device in the embodiment shown in FIG. 8, and/or configured to support another process of the technology described in this specification.

In addition, for an embodiment of the transceiver module 1020, refer to the descriptions of the embodiments of the transceiver module 920.

The transceiver module 1020 is configured to receive first information.

The processing module 1010 is configured to determine, based on the first information, to process a first radio bearer in a first processing manner, where the first processing manner is activating or deactivating a data packet compression function of the first radio bearer.

In some embodiments, deactivating a data packet compression function of the first radio bearer indicates changing the data packet compression function of the first radio bearer from an active state to an inactive state; and/or activating a data packet compression function of the first radio bearer indicates changing the data packet compression function of the first radio bearer from an inactive state to an active state, where in the active state, a data packet over the first radio bearer includes a compression packet header, and in the inactive state, a data packet over the first radio bearer does not include a compression packet header.

In some embodiments, the first information is included in a control PDU, a MAC CE, or a first data packet.

In some embodiments, the control PDU is a PDCP control PDU or an RLC control PDU.

In some embodiments, the first information is included in the first data packet, and the first information is indicated by using one or more reserved bits in a packet header of the first data packet.

In some embodiments, the one or more reserved bits are located in a compression packet header included in the packet header of the first data packet; or the one or more reserved bits are located in the packet header of the first data packet, but are not located in a compression packet header included in the packet header of the first data packet.

In some embodiments, the first information is used to indicate to use the first processing manner on the first radio bearer starting from the $1^{st}$ data packet received after the first information; the first information is included in the first data packet, and the first information is used to indicate to use the first processing manner on the first radio bearer starting from the first data packet; the first information further includes indication information, the indication information is used to indicate a serial number of a second data packet, and the first information is used to indicate to use the first processing manner on the first radio bearer starting from the second data packet; or the first information further includes indication information, the indication information is used to indicate a serial number of a second data packet minus 1, and the first information is used to indicate to use the first processing manner on the first radio bearer starting from a next data packet of the second data packet.

In some embodiments, the processing module 1010 is further configured to: after the data packet compression function of the first radio bearer is activated or deactivated, reset a predefined dictionary corresponding to the first radio bearer, where the predefined dictionary is used to compress, by using the data packet compression function, a data packet transmitted over the first radio bearer.

In some embodiments, if the first device 900 (e.g., a device that sends the first information) is the terminal device, and the second device 1000 is the network device, the transceiver module 1020 is further configured to: receive a first message, where the first message is used to indicate a first capability, and the first capability is a capability of dynamically activating or deactivating a data packet compression function; and send a second message, where the second message is used to configure the first radio bearer to be capable of activating or deactivating the data packet compression function.

In some embodiments, the second message is further used to configure the data compression function of the first radio bearer to be in the active state, or after the second message is sent, the data compression function of the first radio bearer is in the inactive state, where the second message is not used to configure the data compression function of the first radio bearer to be in the active state.

In some embodiments, if the first device 900 (e.g., a device that sends the first information) is the network device, and the second device 1000 is the terminal device, the transceiver module 1020 is further configured to send a first message, where the first message is used to indicate a first capability, and the first capability is a capability of dynamically activating or deactivating a data packet compression function.

For another function that is implemented by the second device 1000, refer to related descriptions of the embodiment shown in FIG. 4A, the embodiment shown in FIG. 4B, the embodiment shown in FIG. 6, the embodiment shown in FIG. 7, or the embodiment shown in FIG. 8. Details are not described again.

An embodiment of this application further provides a communication apparatus, and the communication apparatus may be a terminal device or a circuit. The communication apparatus may be configured to perform an action performed by the terminal device in the foregoing method embodiments.

Figure 11:
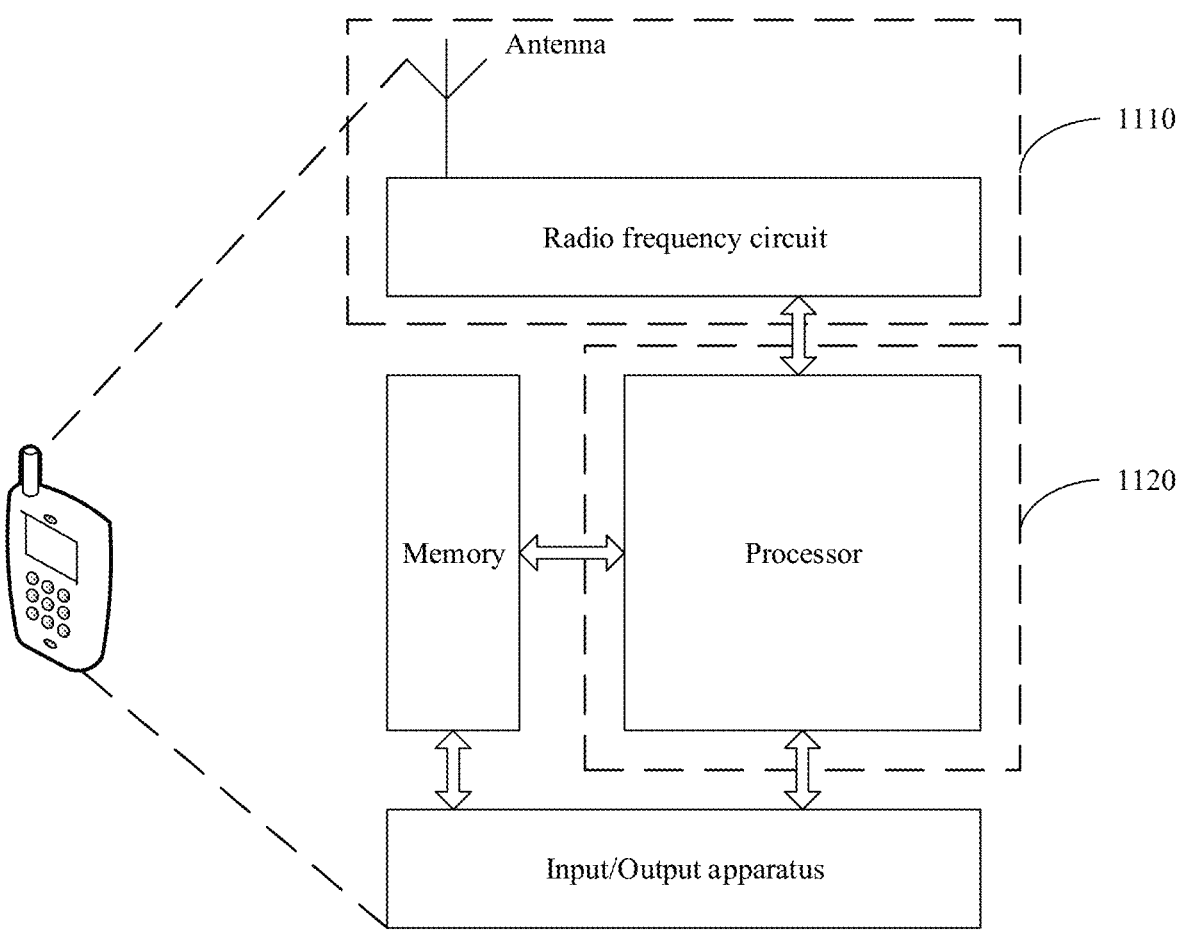
FIG. 11 is a schematic block diagram of a communication apparatus according to some embodiments.

When the communication apparatus is the terminal device, FIG. 11 is a simplified schematic diagram of a structure of the terminal device. For ease of understanding and ease of illustration, in FIG. 11, an example in which terminal device is a mobile phone is used. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, a keyboard, is mainly configured to: receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 11 shows only one memory and one processor. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device (where the transceiver unit may be one functional unit, and the functional unit can implement the sending and receiving functions; or the transceiver unit may include two functional units, namely, a receiving unit that can implement the receiving function and a sending unit that can implement the sending function), and the processor that has a processing function is considered as a processing unit of the terminal device. As shown in FIG. 11, the terminal device includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, or the like. In some embodiments, a component that is in the transceiver unit 1110 and that is configured to implement a receiving function may be considered as a receiving unit, and a component that is in the transceiver unit 1110 and that is configured to implement a sending function may be considered as a sending unit. That is, the transceiver unit 1110 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit may also be sometimes referred to as a transmitting machine, a transmitter, a transmit circuit, or the like.

It should be understood that if a first device is a terminal device, the transceiver unit 1110 is configured to perform a sending operation and a receiving operation on the first device side in the foregoing method embodiments, and the processing unit 1120 is configured to perform an operation except the sending operation and the receiving operation on the first device in the foregoing method embodiments. Alternatively, if a second device is a terminal device, the transceiver unit 1110 is configured to perform a sending operation and a receiving operation on the second device side in the foregoing method embodiments, and the processing unit 1120 is configured to perform an operation except the sending operation and the receiving operation on the second device in the foregoing method embodiments.

For example, in some embodiments, the processing unit 1120 may be configured to perform all operations, such as S41 and S46, that are performed by the terminal device in the embodiment shown in FIG. 4A except sending and receiving operations, and/or configured to support another process of the technology described in this specification. The transceiver unit 1110 may be configured to perform all the sending and receiving operations, such as S42, S43, and S45, that are performed by the terminal device in the embodiment shown in FIG. 4A, and/or configured to support another process of the technology described in this specification.

For another example, in some embodiments, the processing unit 1120 may be configured to perform all operations, such as S46, that are performed by the terminal device in the embodiment shown in FIG. 4B except sending and receiving operations, and/or configured to support another process of the technology described in this specification. The transceiver unit 1110 may be configured to perform all the sending and receiving operations, such as S44 and S45, that are performed by the terminal device in the embodiment shown in FIG. 4B, and/or configured to support another process of the technology described in this specification.

For another example, in some embodiments, the processing unit 1120 may be configured to perform all operations, such as S63, S65, and S67, that are performed by the terminal device in the embodiment shown in FIG. 6 except sending and receiving operations, and/or configured to support another process of the technology described in this specification. The transceiver unit 1110 may be configured to perform all the sending and receiving operations, such as S61, S62, S64, and S66, that are performed by the terminal device in the embodiment shown in FIG. 6, and/or configured to support another process of the technology described in this specification.

For another example, in some embodiments, the processing unit 1120 may be configured to perform all operations, such as S73, S75, and S77, that are performed by the terminal device in the embodiment shown in FIG. 7 except sending and receiving operations, and/or configured to support another process of the technology described in this specification. The transceiver unit 1110 may be configured to perform all the sending and receiving operations, such as S71, S72, S74, and S78, that are performed by the terminal device in the embodiment shown in FIG. 7, and/or configured to support another process of the technology described in this specification.

For yet another example, in some embodiments, the processing unit 1120 may be configured to perform all operations, such as S83, S85, and S87, that are performed by the terminal device in the embodiment shown in FIG. 8 except sending and receiving operations, and/or configured to support another process of the technology described in this specification. The transceiver unit 1110 may be configured to perform all the sending and receiving operations, such as S81, S82, S84, and S86, that are performed by the terminal device in the embodiment shown in FIG. 8, and/or configured to support another process of the technology described in this specification.

When the communication apparatus is a chip apparatus or circuit, the apparatus may include a transceiver unit and a processing unit. The transceiver unit may be an input/output circuit and/or a communications interface. The processing unit is an integrated processor, a microprocessor, or an integrated circuit.

Figure 12:
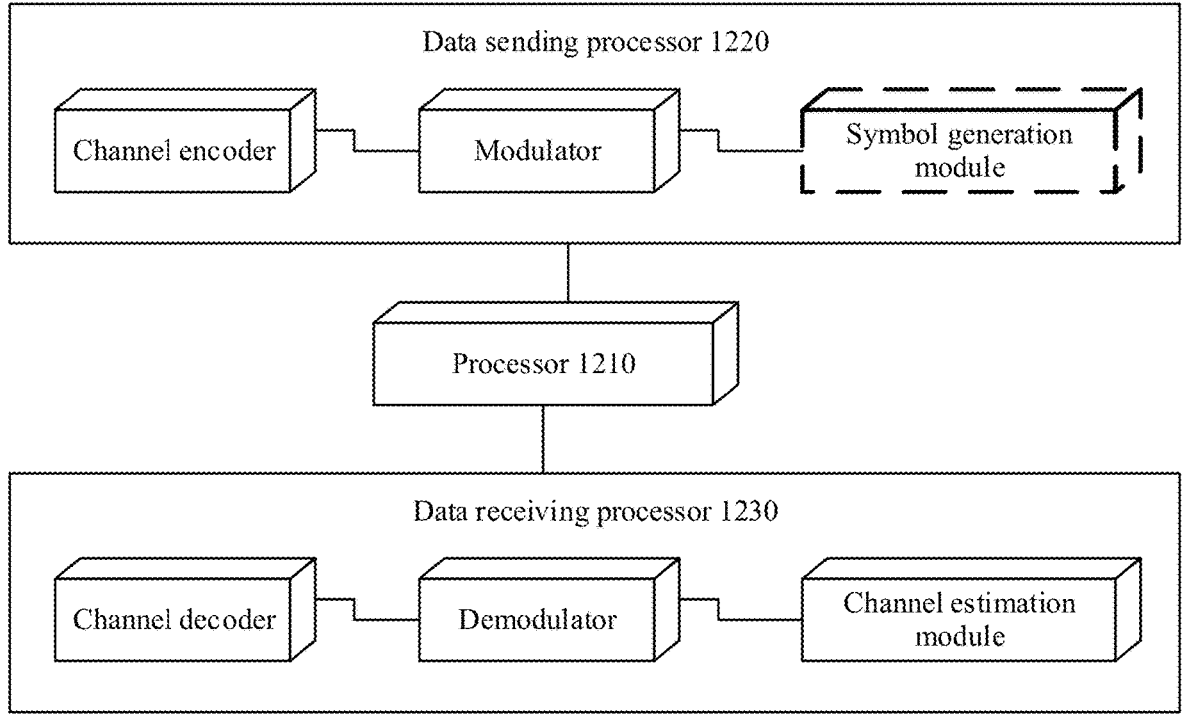
FIG. 12 is another schematic block diagram of a communication apparatus according to some embodiments.

When the communication apparatus in this embodiment is the terminal device, refer to a device shown in FIG. 12. In an example, if the first device 900 is the terminal device, the device may implement a function similar to a function of the processing module 910 in FIG. 9. In another example, if the second device 1000 is the terminal device, the device may implement a function similar to a function of the processing module 1010 in FIG. 10. In FIG. 12, the device includes a processor 1210, a data sending processor 1220, and a data receiving processor 1230. The processing module 910 in the foregoing embodiment may be the processor 1210 in FIG. 12, and implement a corresponding function. The transceiver module 920 in the foregoing embodiment may be the data sending processor 1220 and/or the data receiving processor 1230 in FIG. 12, and implement a corresponding function. Alternatively, the processing module 1010 in the foregoing embodiment may be the processor 1210 in FIG. 12, and implement a corresponding function. The transceiver module 1020 in the foregoing embodiment may be the data sending processor 1220 and/or the data receiving processor 1230 in FIG. 12, and implement a corresponding function. Although FIG. 12 shows a channel encoder and a channel decoder, it may be understood that the modules are merely examples, and do not constitute a limitation on this embodiment.

Figure 13:
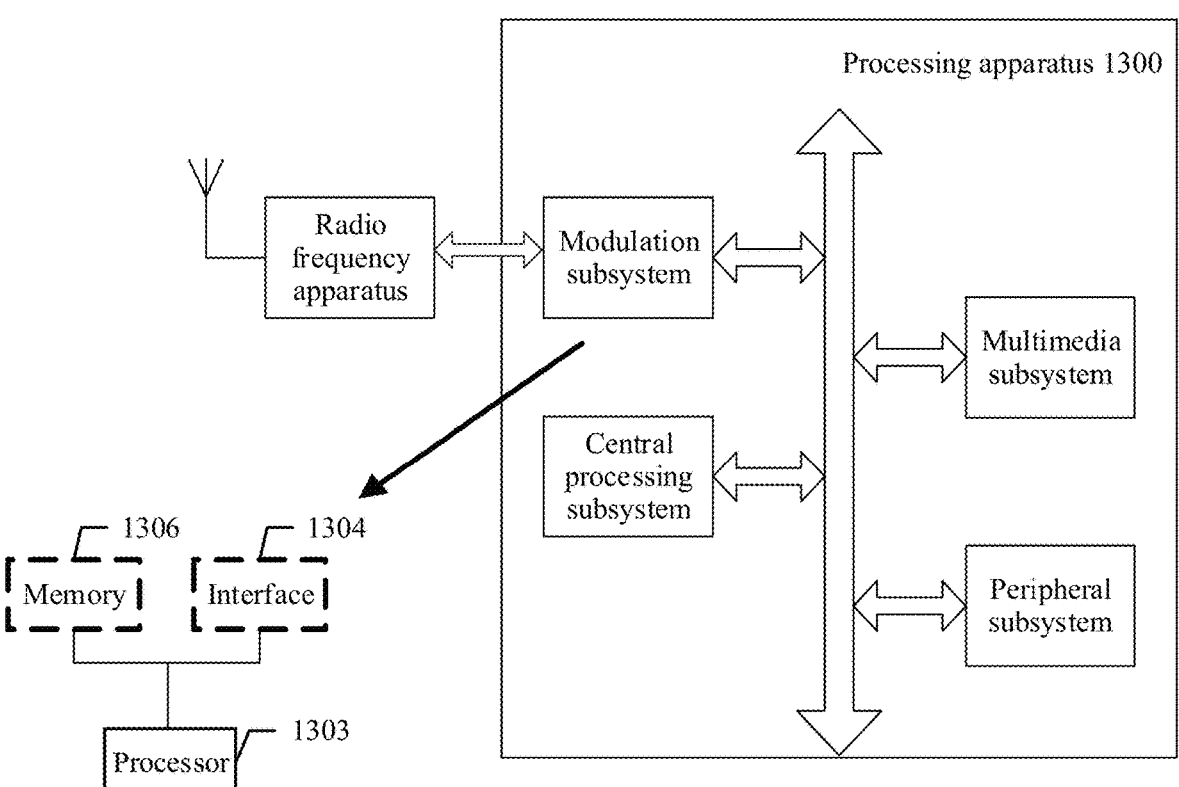
FIG. 13 is still another schematic block diagram of a communication apparatus according to some embodiments.

FIG. 13 shows another form of this embodiment. A processing apparatus 1300 includes modules such as a modulation subsystem, a central processing subsystem, and a peripheral subsystem. The communication apparatus in this embodiment may be used as the modulation subsystem. In one embodiment, the modulation subsystem may include a processor 1303 and an interface 1304. If the first device 900 is the terminal device, the processor 1303 completes a function of the processing module 910, and the interface 1304 completes a function of the transceiver module 920. Alternatively, if the second device 1000 is the terminal device, the processor 1303 completes a function of the processing module 1010, and the interface 1304 completes a function of the transceiver module 1020. In another variation, the modulation subsystem includes a memory 1306, a processor 1303, and a program that is stored in the memory 1306 and that can be run on the processor. When executing the program, the processor 1303 implements the method on the terminal device side in the foregoing method embodiments. It should be noted that the memory 1306 may be a non-volatile memory or a volatile memory. The memory 1306 may be located in the modulation subsystem, or may be located in the processing apparatus 1300, provided that the memory 1306 can be connected to the processor 1303.

Figure 14:
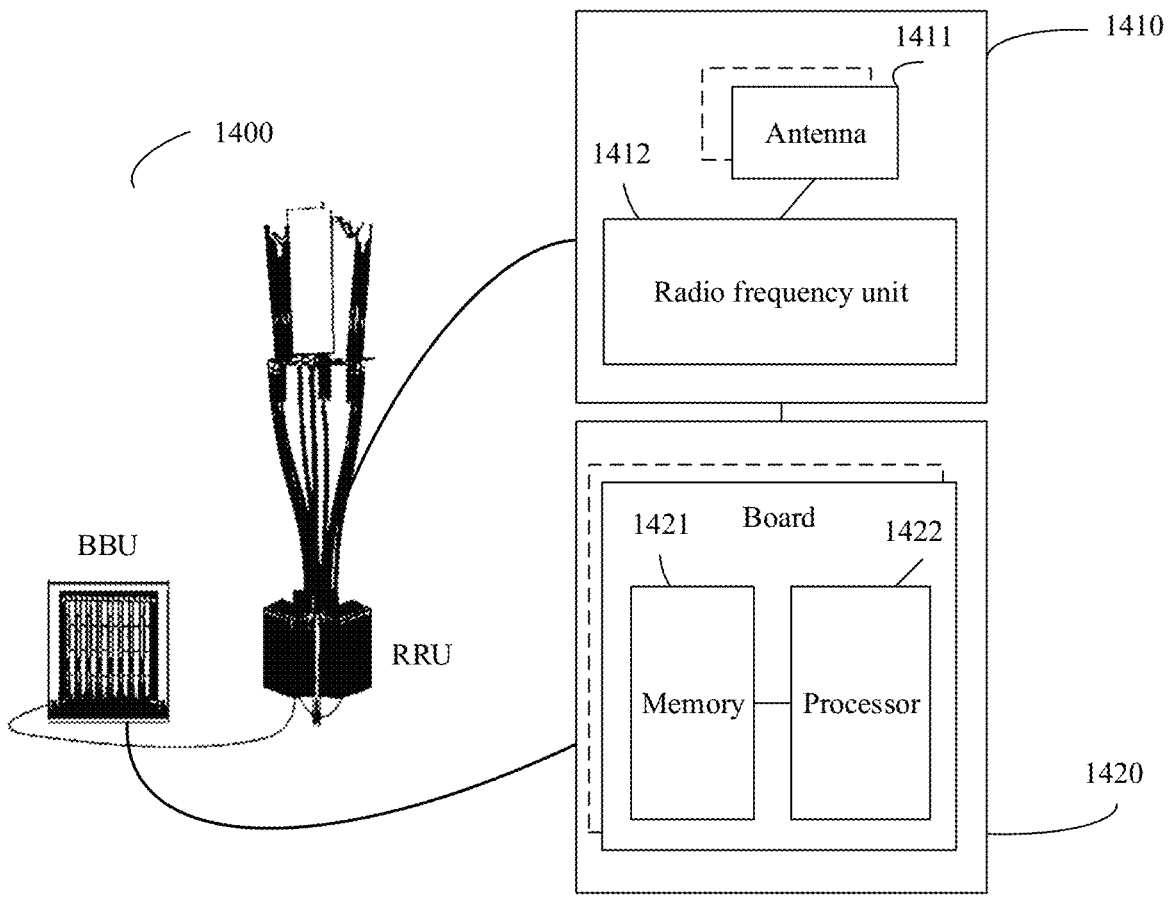
FIG. 14 is yet another schematic block diagram of a communication apparatus according to some embodiments.

When the apparatus in this embodiment of this application is a network device, the apparatus may be as shown in FIG. 14. The apparatus 1400 includes one or more radio frequency units, such as a remote radio unit (RRU) 1410 and one or more baseband units (BBUs) (which may also be referred to as digital units (DUs)) 1420. The RRU 1410 may be referred to as a transceiver module. The transceiver module may include a sending module and a receiving module, or the transceiver module may be a module that can implement sending and receiving functions. If the first device 900 is the network device, the transceiver module may correspond to the transceiver module 920 in FIG. 9. Alternatively, if the second device 1000 is the network device, the transceiver module may correspond to the transceiver module 1020 in FIG. 10. In some embodiments, the transceiver module may also be referred to as a transceiver machine, a transceiver circuit, a transceiver, or the like, and may include at least one antenna 1411 and a radio frequency unit 1412. The RRU 1410 is mainly configured to: receive and send a radio frequency signal, and perform conversion between a radio frequency signal and a baseband signal, for example, send indication information to a terminal device. The BBU 1420 is mainly configured to perform baseband processing, control a base station, and the like. The RRU 1410 and the BBU 1420 may be physically disposed together, or may be physically disposed separately, in one embodiment, may be on a distributed base station.

The BBU 1420 is a control center of the base station, and may also be referred to as a processing module. If the first device 900 is the network device, the processing module may correspond to the processing module 910 in FIG. 9. Alternatively, if the second device 1000 is the network device, the processing module may correspond to the processing module 1010 in FIG. 10, and is mainly configured to complete a baseband processing function, such as channel encoding, multiplexing, modulation, and spectrum spreading. For example, the BBU (the processing module) may be configured to control the base station to perform an operation procedure related to the network device in the foregoing method embodiment, for example, generate the foregoing indication information.

In an example, the BBU 1420 may include one or more boards, and a plurality of boards may jointly support a radio access network (for example, an LTE network) having a single access standard, or may separately support radio access networks (for example, an LTE network, a 5G network, or another network) having different access standards. The BBU 1420 further includes a memory 1421 and a processor 1422. The memory 1421 is configured to store instructions and data. The processor 1422 is configured to control the base station to perform an action, for example, configured to control the base station to perform an operation procedure related to the network device in the foregoing method embodiment. The memory 1421 and the processor 1422 may serve the one or more boards. In other words, the memory and the processor may be disposed on each board. Alternatively, a plurality of boards may share a same memory and a same processor.

An embodiment of this application provides a communications system. The communications system may include the first device in the embodiment shown in FIG. 4A, and include the second device in the embodiment shown in FIG. 4A. Alternatively, the communications system includes the first device in the embodiment shown in FIG. 4B, and includes the second device in the embodiment shown in FIG. 4B. The first device is, for example, the first device 900 in FIG. 9. The second device is, for example, the second device 1000 in FIG. 10.

An embodiment of this application further provides a computer-readable storage medium. The computer-readable storage medium stores a computer program. When the computer program is executed by a computer, the computer may implement a procedure related to the first device provided in the method embodiment shown in FIG. 4A.

An embodiment of this application further provides a computer-readable storage medium. The computer-readable storage medium is used to store a computer program. When the computer program is executed by a computer, the computer may implement a procedure related to the second device provided in the method embodiment shown in FIG. 4A.

An embodiment of this application further provides a computer-readable storage medium. The computer-readable storage medium stores a computer program. When the computer program is executed by a computer, the computer may implement a procedure related to the first device provided in the method embodiment shown in FIG. 4B.

An embodiment of this application further provides a computer-readable storage medium. The computer-readable storage medium is used to store a computer program. When the computer program is executed by a computer, the computer may implement a procedure related to the second device provided in the method embodiment shown in FIG. 4B.

An embodiment of this application further provides a computer-readable storage medium. The computer-readable storage medium stores a computer program. When the computer program is executed by a computer, the computer may implement a procedure related to the first device provided in the method embodiment shown in FIG. 6.

An embodiment of this application further provides a computer-readable storage medium. The computer-readable storage medium is used to store a computer program. When the computer program is executed by a computer, the computer may implement a procedure related to the second device provided in the method embodiment shown in FIG. 6.

An embodiment of this application further provides a computer-readable storage medium. The computer-readable storage medium stores a computer program. When the computer program is executed by a computer, the computer may implement a procedure related to the first device provided in the method embodiment shown in FIG. 7.

An embodiment of this application further provides a computer-readable storage medium. The computer-readable storage medium is used to store a computer program. When the computer program is executed by a computer, the computer may implement a procedure related to the second device provided in the method embodiment shown in FIG. 7.

An embodiment of this application further provides a computer-readable storage medium. The computer-readable storage medium stores a computer program. When the computer program is executed by a computer, the computer may implement a procedure related to the first device provided in the method embodiment shown in FIG. 8.

An embodiment of this application further provides a computer-readable storage medium. The computer-readable storage medium is used to store a computer program. When the computer program is executed by a computer, the computer may implement a procedure related to the second device provided in the method embodiment shown in FIG. 8.

An embodiment of this application further provides a computer program product. The computer program product is configured to store a computer program. When the computer program is executed by a computer, the computer may implement a procedure related to the first device provided in the method embodiment shown in FIG. 4A.

An embodiment of this application further provides a computer program product. The computer program product is configured to store a computer program. When the computer program is executed by a computer, the computer may implement a procedure related to the second device provided in the method embodiment shown in FIG. 4A.

An embodiment of this application further provides a computer program product. The computer program product is configured to store a computer program. When the computer program is executed by a computer, the computer may implement a procedure related to the first device provided in the method embodiment shown in FIG. 4B.

An embodiment of this application further provides a computer program product. The computer program product is configured to store a computer program. When the computer program is executed by a computer, the computer may implement a procedure related to the second device provided in the method embodiment shown in FIG. 4B.

An embodiment of this application further provides a computer program product. The computer program product is configured to store a computer program. When the computer program is executed by a computer, the computer may implement a procedure related to the first device provided in the method embodiment shown in FIG. 6.

An embodiment of this application further provides a computer program product. The computer program product is configured to store a computer program. When the computer program is executed by a computer, the computer may implement a procedure related to the second device provided in the method embodiment shown in FIG. 6.

An embodiment of this application further provides a computer program product. The computer program product is configured to store a computer program. When the computer program is executed by a computer, the computer may implement a procedure related to the first device provided in the method embodiment shown in FIG. 7.

An embodiment of this application further provides a computer program product. The computer program product is configured to store a computer program. When the computer program is executed by a computer, the computer may implement a procedure related to the second device provided in the method embodiment shown in FIG. 7.

An embodiment of this application further provides a computer program product. The computer program product is configured to store a computer program. When the computer program is executed by a computer, the computer may implement a procedure related to the first device provided in the method embodiment shown in FIG. 8.

An embodiment of this application further provides a computer program product. The computer program product is configured to store a computer program. When the computer program is executed by a computer, the computer may implement a procedure related to the second device provided in the method embodiment shown in FIG. 8.

It should be understood that the processor in embodiments of this application may be a CPU, or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It may be understood that the memory mentioned embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another appropriate type.

It should be understood that, in embodiments of this application, sequence numbers of the foregoing processes do not mean execution sequences. The execution sequences of the processes should be determined based on functions and internal logic of the processes, and should not constitute any limitation to embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular constraint conditions of the technical solutions. A person skilled in the art may use different methods to implement the described functions for each particular application, but it should not be considered that the approach goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus and method may be implemented in other manners. For example, the foregoing described apparatus embodiments are merely examples. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, that is, they may be located in one position, or may be distributed on a plurality of network units. Some or all of the units may be selected according to actual requirements to achieve the objective of the solutions of embodiments.

In addition, each functional unit in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the operations of the methods described in embodiments of this application. The foregoing computer-readable storage medium may be any usable medium accessible by the computer. The computer-readable medium may include, for example but not limited to, a random access memory (RAM), a read-only memory (ROM), an electrically erasable programmable read-only memory (EEPROM), a compact disc read-only memory (CD-ROM), a universal serial bus flash disk, a removable hard disk or another compact disc storage, a magnetic disk storage medium or another magnetic storage device, or any other medium that can be used to carry or store expected program code in a form of an instruction or a data structure and that can be accessed by a computer.

The foregoing descriptions are merely embodiments of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

With reference to the foregoing descriptions, this application further provides the following embodiments.

Embodiment 1: A communication method is provided and includes: determining to process a first radio bearer in a first processing manner, where the first processing manner is activating or deactivating a data packet compression function of the first radio bearer; and sending first information, where the first information is used to indicate the first processing manner.

Embodiment 2: According to the method in Embodiment 1, deactivating a data packet compression function of the first radio bearer indicates changing the data packet compression function of the first radio bearer from an active state to an inactive state; and/or activating a data packet compression function of the first radio bearer indicates changing the data packet compression function of the first radio bearer from an inactive state to an active state, where in the active state, a data packet over the first radio bearer includes a compression packet header, and in the inactive state, a data packet over the first radio bearer does not include a compression packet header.

Embodiment 3: According to the method in Embodiment 1 or 2, the first information is included in a control PDU, a MAC CE, or a first data packet.

Embodiment 4: According to the method in Embodiment 3, the control PDU is a PDCP control PDU or an RLC control PDU.

Embodiment 5: According to the method in Embodiment 3, where the first information is included in the first data packet, and the first information is indicated by using one or more reserved bits in a packet header of the first data packet.

Embodiment 6: According to the method in Embodiment 5, the one or more reserved bits are located in a compression packet header included in the packet header of the first data packet; or the one or more reserved bits are located in the packet header of the first data packet, but are not located in a compression packet header included in the packet header of the first data packet.

Embodiment 7: According to the method in any one of Embodiment 1 to Embodiment 6, where the first information is used to indicate to use the first processing manner on the first radio bearer starting from the $1^{st}$ data packet sent after the first information; the first information is included in the first data packet, and the first information is used to indicate to use the first processing manner on the first radio bearer starting from the first data packet; the first information further includes indication information, the indication information is used to indicate a serial number of a second data packet, and the first information is used to indicate to use the first processing manner on the first radio bearer starting from the second data packet; or the first information further includes indication information, the indication information is used to indicate a serial number of a second data packet minus 1, and the first information is used to indicate to use the first processing manner on the first radio bearer starting from a next data packet of the second data packet.

Embodiment 8: According to the method in any one of Embodiment 1 to Embodiment 7, the method further includes: after the data packet compression function of the first radio bearer is activated or deactivated, resetting a predefined dictionary corresponding to the first radio bearer, where the predefined dictionary is used to compress, by using the data packet compression function, a data packet transmitted over the first radio bearer.

Embodiment 9: According to the method in any one of Embodiment 1 to Embodiment 8, the method further includes: sending a first message, where the first message is used to indicate a first capability, and the first capability is a capability of dynamically activating or deactivating a data packet compression function; and receiving a second message, where the second message is used to configure the first radio bearer to be capable of activating or deactivating the data packet compression function.

Embodiment 10: According to the method in Embodiment 9, the second message is further used to configure the data compression function of the first radio bearer to be in the active state, or after the second message is received, the data compression function of the first radio bearer is in the inactive state, where the second message is not used to configure the data compression function of the first radio bearer to be in the active state.

Embodiment 11: According to the method in any one of Embodiment 1 to Embodiment 8, the method further includes: receiving a first message, where the first message is used to indicate a first capability, and the first capability is a capability of dynamically activating or deactivating a data packet compression function.

Embodiment 12: A communication method is provided and includes: receiving first information; and determining, based on the first information, to process a first radio bearer in a first processing manner, where the first processing manner is activating or deactivating a data packet compression function of the first radio bearer.

Embodiment 13: According to the method in Embodiment 12, deactivating a data packet compression function of the first radio bearer indicates changing the data packet compression function of the first radio bearer from an active state to an inactive state; and/or activating a data packet compression function of the first radio bearer indicates changing the data packet compression function of the first radio bearer from an inactive state to an active state, where in the active state, a data packet over the first radio bearer includes a compression packet header, and in the inactive state, a data packet over the first radio bearer does not include a compression packet header.

Embodiment 14: According to the method in Embodiment 12 or 13, the first information is included in a control PDU, a MAC CE, or a first data packet.

Embodiment 15: According to the method in Embodiment 14, the control PDU is a PDCP control PDU or an RLC control PDU.

Embodiment 16: According to the method in Embodiment 14, where the first information is included in the first data packet, and the first information is indicated by using one or more reserved bits in a packet header of the first data packet.

Embodiment 17: According to the method in Embodiment 16, the one or more reserved bits are located in a compression packet header included in the packet header of the first data packet; or the one or more reserved bits are located in the packet header of the first data packet, but are not located in a compression packet header included in the packet header of the first data packet.

Embodiment 18: According to the method in any one of Embodiment 12 to Embodiment 17, where the first information is used to indicate to use the first processing manner on the first radio bearer starting from the $1^{st}$ data packet received after the first information; the first information is included in the first data packet, and the first information is used to indicate to use the first processing manner on the first radio bearer starting from the first data packet; the first information further includes indication information, the indication information is used to indicate a serial number of a second data packet, and the first information is used to indicate to use the first processing manner on the first radio bearer starting from the second data packet; or the first information further includes indication information, the indication information is used to indicate a serial number of a second data packet minus 1, and the first information is used to indicate to use the first processing manner on the first radio bearer starting from a next data packet of the second data packet.

Embodiment 19: According to the method in any one of Embodiment 12 to Embodiment 18, the method further includes: after the data packet compression function of the first radio bearer is activated or deactivated, resetting a predefined dictionary corresponding to the first radio bearer, where the predefined dictionary is used to compress, by using the data packet compression function, a data packet transmitted over the first radio bearer.

Embodiment 20: According to the method in any one of Embodiment 12 to Embodiment 19, the method further includes: receiving a first message, where the first message is used to indicate a first capability, and the first capability is a capability of dynamically activating or deactivating a data packet compression function; and sending a second message, where the second message is used to configure the first radio bearer to be capable of activating or deactivating the data packet compression function.

Embodiment 21: According to the method in Embodiment 20, the second message is further used to configure the data compression function of the first radio bearer to be in the active state, or after the second message is sent, the data compression function of the first radio bearer is in the inactive state, where the second message is not used to configure the data compression function of the first radio bearer to be in the active state.

Embodiment 22: According to the method in any one of Embodiment 12 to Embodiment 19, the method further includes: sending a first message, where the first message is used to indicate a first capability, and the first capability is a capability of dynamically activating or deactivating a data packet compression function.

Embodiment 23: A communication apparatus is provided and includes: a processing module, configured to determine to process a first radio bearer in a first processing manner, where the first processing manner is activating or deactivating a data packet compression function of the first radio bearer; and a transceiver module, configured to send first information, where the first information is used to indicate the first processing manner.

Embodiment 24: According to the communication apparatus in Embodiment 23, deactivating a data packet compression function of the first radio bearer indicates changing the data packet compression function of the first radio bearer from an active state to an inactive state; and/or activating a data packet compression function of the first radio bearer indicates changing the data packet compression function of the first radio bearer from an inactive state to an active state, where in the active state, a data packet over the first radio bearer includes a compression packet header, and in the inactive state, a data packet over the first radio bearer does not include a compression packet header.

Embodiment 25: According to the communication apparatus in Embodiment 23 or 24, the first information is included in a control PDU, a MAC CE, or a first data packet.

Embodiment 26: According to the communication apparatus in Embodiment 25, the control PDU is a PDCP control PDU or an RLC control PDU.

Embodiment 27: According to the communication apparatus in Embodiment 25, where the first information is included in the first data packet, and the first information is indicated by using one or more reserved bits in a packet header of the first data packet.

Embodiment 28: According to the communication apparatus in Embodiment 27, the one or more reserved bits are located in a compression packet header included in the packet header of the first data packet; or the one or more reserved bits are located in the packet header of the first data packet, but are not located in a compression packet header included in the packet header of the first data packet.

Embodiment 29: According to the communication apparatus in Embodiment 23 to Embodiment 28, the first information is used to indicate to use the first processing manner on the first radio bearer starting from the $1^{st}$ data packet sent after the first information; the first information is included in the first data packet, and the first information is used to indicate to use the first processing manner on the first radio bearer starting from the first data packet; the first information further includes indication information, the indication information is used to indicate a serial number of a second data packet, and the first information is used to indicate to use the first processing manner on the first radio bearer starting from the second data packet; or the first information further includes indication information, the indication information is used to indicate a serial number of a second data packet minus 1, and the first information is used to indicate to use the first processing manner on the first radio bearer starting from a next data packet of the second data packet.

Embodiment 30: According to the communication apparatus in Embodiment 23 to Embodiment 29, the processing module is further configured to: after the data packet compression function of the first radio bearer is activated or deactivated, reset a predefined dictionary corresponding to the first radio bearer, where the predefined dictionary is used to compress, by using the data packet compression function, a data packet transmitted over the first radio bearer.

Embodiment 31: According to the communication apparatus in any one of Embodiments 23 to 30, the transceiver module is further configured to: send a first message, where the first message is used to indicate a first capability, and the first capability is a capability of dynamically activating or deactivating a data packet compression function; and receive a second message, where the second message is used to configure the first radio bearer to be capable of activating or deactivating the data packet compression function.

Embodiment 32: According to the communication apparatus in Embodiment 31, the second message is further used to configure the data compression function of the first radio bearer to be in the active state, or after the second message is received, the data compression function of the first radio bearer is in the inactive state, where the second message is not used to configure the data compression function of the first radio bearer to be in the active state.

Embodiment 33: According to the communication apparatus according to any one of Embodiments 23 to 30, the transceiver module is further configured to receive a first message, where the first message is used to indicate a first capability, and the first capability is a capability of dynamically activating or deactivating a data packet compression function.

Embodiment 34: A communication apparatus is provided and includes: a transceiver module, configured to receive first information; and a processing module, configured to determine, based on the first information, to process a first radio bearer in a first processing manner, where the first processing manner is activating or deactivating a data packet compression function of the first radio bearer.

Embodiment 35: According to the communication apparatus in Embodiment 34, deactivating a data packet compression function of the first radio bearer indicates changing the data packet compression function of the first radio bearer from an active state to an inactive state; and/or activating a data packet compression function of the first radio bearer indicates changing the data packet compression function of the first radio bearer from an inactive state to an active state, where in the active state, a data packet over the first radio bearer includes a compression packet header, and in the inactive state, a data packet over the first radio bearer does not include a compression packet header.

Embodiment 36: According to the communication apparatus in Embodiments 34 or 35, the first information is included in a control PDU, a MAC CE, or a first data packet.

Embodiment 37: According to the communication apparatus in Embodiment 36, the control PDU is a PDCP control PDU or an RLC control PDU.

Embodiment 38: According to the communication apparatus in Embodiment 36, where the first information is included in the first data packet, and the first information is indicated by using one or more reserved bits in a packet header of the first data packet.

Embodiment 39: According to the communication apparatus in Embodiment 38, the one or more reserved bits are located in a compression packet header included in the packet header of the first data packet; or the one or more reserved bits are located in the packet header of the first data packet, but are not located in a compression packet header included in the packet header of the first data packet.

Embodiment 40: According to the communication apparatus in Embodiment 34 to Embodiment 39, the first information is used to indicate to use the first processing manner on the first radio bearer starting from the 1$^{st}$ data packet received after the first information; the first information is included in the first data packet, and the first information is used to indicate to use the first processing manner on the first radio bearer starting from the first data packet; the first information further includes indication information, the indication information is used to indicate a serial number of a second data packet, and the first information is used to indicate to use the first processing manner on the first radio bearer starting from the second data packet; or the first information further includes indication information, the indication information is used to indicate a serial number of a second data packet minus 1, and the first information is used to indicate to use the first processing manner on the first radio bearer starting from a next data packet of the second data packet.

Embodiment 41: According to the communication apparatus in Embodiment 34 to Embodiment 40, the processing module is further configured to: after the data packet compression function of the first radio bearer is activated or deactivated, reset a predefined dictionary corresponding to the first radio bearer, where the predefined dictionary is used to compress, by using the data packet compression function, a data packet transmitted over the first radio bearer.

Embodiment 42: According to the communication apparatus in any one of Embodiments 34 to 41, the transceiver module is further configured to: receive a first message, where the first message is used to indicate a first capability, and the first capability is a capability of dynamically activating or deactivating a data packet compression function; and send a second message, where the second message is used to configure the first radio bearer to be capable of activating or deactivating the data packet compression function.

Embodiment 43: According to the communication apparatus in Embodiment 42, the second message is further used to configure the data compression function of the first radio bearer to be in the active state, or after the second message is sent, the data compression function of the first radio bearer is in the inactive state, where the second message is not used to configure the data compression function of the first radio bearer to be in the active state.

Embodiment 44: According to the communication apparatus according to any one of Embodiment 34 to Embodiment 41, the transceiver module is further configured to send a first message, where the first message is used to indicate a first capability, and the first capability is a capability of dynamically activating or deactivating a data packet compression function.

Embodiment 45: A communication apparatus is provided. The communication apparatus includes a processor and a transceiver. The processor and the transceiver are coupled, to perform the method according to any one of Embodiment 1 to Embodiment 11 or the method according to any one of Embodiment 12 to Embodiment 22.

Embodiment 46: A chip is provided. The chip includes a processor. When the processor executes instructions, the method according to any one of Embodiment 1 to Embodiment 11 is implemented or the method according to any one of Embodiment 12 to Embodiment 22 is implemented. The instructions may be from a memory inside the chip, or may be from a memory outside the chip. In some embodiments, the chip further includes an input/output circuit. In some embodiments, the input/output circuit includes, for example, a communications interface.

Embodiment 47: A communications system is provided. The communications system includes the communication apparatus according to any one of Embodiment 23 to Embodiment 33 and the communication apparatus according to any one of Embodiment 34 to Embodiment 44.

Embodiment 48: A computer-readable storage medium is provided. The computer-readable storage medium is used to store a computer program, and when the computer program is run on a computer, the computer is enabled to perform the method according to any one of Embodiment 1 to Embodiment 11 or the method according to any one of Embodiment 12 to Embodiment 22.

Embodiment 49: A computer program product is provided. The computer program product is configured to store a computer program, and when the computer program is run on a computer, the computer is enabled to implement the method according to any one of Embodiment 1 to Embodiment 11 or the method according to any one of Embodiment 12 to Embodiment 22.

Although this application is described with reference to embodiments herein, a person skilled in the art may understand and implement another variation of the disclosed embodiments by viewing the accompanying drawings, disclosed content, and the appended claims. In the claims, "comprising" does not exclude another component or another operation, and "a" or "one" does not exclude a case of a plurality. A single processor or another unit may implement several functions enumerated in the claims. Some measures are recorded in dependent claims that are different from each other, but this does not mean that the measures cannot be combined to produce a good effect.

What is claimed is:

1. A communication method, comprising:

determining, by a first device, to process a first radio bearer in a first processing manner, wherein the first processing manner is activating or deactivating a data packet compression function of the first radio bearer;

sending first information, wherein the first information is used to indicate the first processing manner; and in response to the data packet compression function of the first radio bearer being activated or deactivated, resetting, by the first device, a predefined dictionary corresponding to the first radio bearer, wherein the resetting is performed by the first device without receiving an indication from a second device to perform the resetting;

deactivating the data packet compression function of the first radio bearer indicates changing the data packet compression function of the first radio bearer from an active state to an inactive state; and activating the data packet compression function of the first radio bearer indicates changing the data packet compression function of the first radio bearer from an inactive state to an active state, wherein in the active state, a data packet over the first radio bearer comprises a compression packet header, and in the inactive state, a data packet over the first radio bearer does not comprise a compression packet header.

2. The method according to claim 1, wherein the first information is comprised in a control protocol data unit (PDU), a media access control (MAC) control element (CE), or a first data packet.

3. The method according to claim 2, wherein the control PDU is a packet data convergence protocol PDCP control PDU or a radio link control RLC control PDU.

4. The method according to claim 2, wherein the first information is used to indicate to use the first processing manner on the first radio bearer starting from the first data packet sent after the first information;

the first information is comprised in the first data packet, and the first information is used to indicate to use the first processing manner on the first radio bearer starting from the first data packet;

the first information further comprises indication information, the indication information is used to indicate a serial number of a second data packet, and the first information is used to indicate to use the first processing manner on the first radio bearer starting from the second data packet; or the first information further comprises indication information, the indication information is used to indicate a serial number of a second data packet minus 1, and the first information is used to indicate to use the first processing manner on the first radio bearer starting from a next data packet of the second data packet.

5. The method according to claim 1, wherein the predefined dictionary is used to compress, by using the data packet compression function, a data packet transmitted over the first radio bearer.

6. The method according to claim 1, wherein the method further comprises:

sending a first message, wherein the first message is used to indicate a first capability, and the first capability is a capability of dynamically activating or deactivating the data packet compression function; and receiving a second message, wherein the second message is used to enable the first radio bearer to activate or deactivate the data packet compression function.

7. The method according to claim 6, wherein the second message is further used to configure the data packet compression function of the first radio bearer to be in an active state, or after the second message is received, the data packet compression function of the first radio bearer is in an inactive state, wherein the second message is not used to configure the data packet compression function of the first radio bearer to be in the active state.

8. A communication method, comprising:

receiving first information;

determining, by a first device and based on the first information, to process a first radio bearer in a first processing manner, wherein the first processing manner is activating or deactivating a data packet compression function of the first radio bearer; and in response to the data packet compression function of the first radio bearer being activated or deactivated, resetting, by the first device, a predefined dictionary corresponding to the first radio bearer, wherein the resetting is performed by the first device without receiving an indication from a second device to perform the resetting;

deactivating the data packet compression function of the first radio bearer indicates changing the data packet compression function of the first radio bearer from an active state to an inactive state; and activating the data packet compression function of the first radio bearer indicates changing the data packet compression function of the first radio bearer from an inactive state to an active state, wherein in the active state, a data packet over the first radio bearer comprises a compression packet header, and in the inactive state, a data packet over the first radio bearer does not comprise a compression packet header.

9. The method according to claim 8, wherein the first information is used to indicate to use the first processing manner on the first radio bearer starting from the a first data packet received after the first information;

the first information is comprised in the first data packet, and the first information is used to indicate to use the first processing manner on the first radio bearer starting from the first data packet;

the first information further comprises indication information, the indication information is used to indicate a serial number of a second data packet, and the first information is used to indicate to use the first processing manner on the first radio bearer starting from the second data packet; or the first information further comprises indication information, the indication information is used to indicate a serial number of a second data packet minus 1, and the first information is used to indicate to use the first processing manner on the first radio bearer starting from a next data packet of the second data packet.

10. The method according to claim 9, wherein the predefined dictionary is used to compress, by using the data packet compression function, a data packet transmitted over the first radio bearer.

11. The method according to claim 8, wherein the method further comprises:

sending a first message, wherein the first message is used to indicate a first capability, and the first capability is a capability of dynamically activating or deactivating the data packet compression function.

12. A communication apparatus, comprising:

a processor; and a memory, wherein the memory is configured to store a program instruction; and the processor, when invoking the program instruction in the memory, is configured to:

determine to process a first radio bearer in a first processing manner, wherein the first processing manner is activating or deactivating a data packet compression function of the first radio bearer;

send first information, wherein the first information is used to indicate the first processing manner; and in response to the data packet compression function of the first radio bearer being activated or deactivated, reset, by the communication apparatus, a predefined dictionary corresponding to the first radio bearer, the reset performed by the communication apparatus without receiving an indication from a second device to perform the reset, the processor further configured to:

deactivate the data packet compression function of the first radio bearer indicates changing the data packet compression function of the first radio bearer from an active state to an inactive state; and activate the data packet compression function of the first radio bearer indicates changing the data packet compression function of the first radio bearer from an inactive state to an active state, wherein in the active state, a data packet over the first radio bearer comprises a compression packet header, and in the inactive state, a data packet over the first radio bearer does not comprise a compression packet header.

13. The apparatus according to claim 12, wherein the first information is comprised in a control protocol data unit PDU, a media access control MAC control element CE, or a first data packet.

14. The apparatus according to claim 13, wherein the first information is used to indicate to use the first processing manner on the first radio bearer starting from the first data packet sent after the first information;

the first information is comprised in the first data packet, and the first information is used to indicate to use the first processing manner on the first radio bearer starting from the first data packet;

the first information further comprises indication information, the indication information is used to indicate a serial number of a second data packet, and the first information is used to indicate to use the first processing manner on the first radio bearer starting from the second data packet; or the first information further comprises indication information, the indication information is used to indicate a serial number of a second data packet minus 1, and the first information is used to indicate to use the first processing manner on the first radio bearer starting from a next data packet of the second data packet.

15. The apparatus according to claim 12, wherein the predefined dictionary is used to compress, by using the data packet compression function, a data packet transmitted over the first radio bearer.

16. The apparatus according to claim 12, wherein the processor, when invoking the program instruction in the memory, is configured to:

send a first message, wherein the first message is used to indicate a first capability, and the first capability is a capability of dynamically activating or deactivating the data packet compression function; and receive a second message, wherein the second message is used to enable the first radio bearer to activate or deactivate the data packet compression function.

17. The apparatus according to claim 16, wherein the second message is further used to configure the data packet compression function of the first radio bearer to be in an active state, or after the second message is received, the data packet compression function of the first radio bearer is in an inactive state, wherein the second message is not used to configure the data packet compression function of the first radio bearer to be in the active state.

* * * * *